(12) United States Patent
Aubrey et al.

(10) Patent No.: US 12,130,204 B2
(45) Date of Patent: Oct. 29, 2024

(54) RAPIDLY DEPLOYABLE UAS SYSTEM FOR AUTONOMOUS INSPECTION OPERATIONS USING A COMBINED PAYLOAD

(71) Applicant: SeekOps Inc., Austin, TX (US)

(72) Inventors: Andrew David Aubrey, Austin, TX (US); Brendan James Smith, Lakeway, TX (US)

(73) Assignee: SeekOps Inc., Austin, TX (US)

( * ) Notice: Subject to any disclaimer, the term of this patent is extended or adjusted under 35 U.S.C. 154(b) by 236 days.

(21) Appl. No.: 17/629,078

(22) PCT Filed: Aug. 5, 2020

(86) PCT No.: PCT/US2020/044978
§ 371 (c)(1),
(2) Date: Jan. 21, 2022

(87) PCT Pub. No.: WO2021/026215
PCT Pub. Date: Feb. 11, 2021

(65) Prior Publication Data
US 2022/0244127 A1 Aug. 4, 2022

Related U.S. Application Data

(63) Continuation-in-part of application No. PCT/US2020/026246, filed on Apr. 1, 2020.
(Continued)

(51) Int. Cl.
*G01M 3/04* (2006.01)
*B64U 10/13* (2023.01)
(Continued)

(52) U.S. Cl.
CPC ............... *G01M 3/04* (2013.01); *B64U 10/13* (2023.01); *G08G 5/0013* (2013.01);
(Continued)

(58) Field of Classification Search
CPC .. B64C 39/024; G08G 5/0013; G08G 5/0034; G08G 5/0069; G08G 5/045; B64U 10/13;
(Continued)

(56) References Cited

U.S. PATENT DOCUMENTS 3,780,566 A 12/1973 Smith et al.
4,135,092 A 1/1979 Milly
(Continued)

FOREIGN PATENT DOCUMENTS

AU 3401499 A 11/1999
CN 104458588 A 3/2015
(Continued)

OTHER PUBLICATIONS

IEEE Conference Paper, "Research of the high pressure jet performance of small size nozzle," ISBN :978-1-5090-1087-5, Publication Date : Oct. 1, 2016, Conference dates Oct. 10, 2016 thru Oct. 12, 2016.[retrieved from the Internet] on Sep. 1, 2023 at 4:14pm.
(Continued)

*Primary Examiner* — Hongmin Fan
(74) *Attorney, Agent, or Firm* — Concept IP LLP; Michael Zarrabian

(57) ABSTRACT

Systems, devices, and methods for a mobile vehicle, the mobile vehicle comprising a base station; an unmanned aerial vehicle (UAV), where the UAV is launched from the base station; a payload disposed on the UAV, where the payload is configured to generate payload data of at least one infrastructure, and where the payload data comprises at least one of: a gas sensor data, an infrared imager for optical gas imaging (OGI) camera data, an infrared imager tuned for radiometric measurement camera data, a visible camera data, and a 3D mapping data; and a processor in communication with the UAV and the payload, where the processor
(Continued)

is configured to determine an integrity of the at least one infrastructure based on payload data from the payload.

16 Claims, 10 Drawing Sheets

Related U.S. Application Data

(60) Provisional application No. 62/883,026, filed on Aug. 5, 2019.

(51) Int. Cl.
| | |
|---|---|
| *G08G 5/00* | (2006.01) |
| *B64U 10/14* | (2023.01) |
| *B64U 30/20* | (2023.01) |
| *B64U 50/19* | (2023.01) |
| *B64U 80/25* | (2023.01) |
| *B64U 80/70* | (2023.01) |
| *B64U 101/26* | (2023.01) |
| *B64U 101/30* | (2023.01) |
| *B64U 101/60* | (2023.01) |
| *G08G 5/04* | (2006.01) |

(52) U.S. Cl.
CPC .......... *G08G 5/0034* (2013.01); *G08G 5/0069* (2013.01); *B64U 10/14* (2023.01); *B64U 30/20* (2023.01); *B64U 50/19* (2023.01); *B64U 80/25* (2023.01); *B64U 80/70* (2023.01); *B64U 2101/26* (2023.01); *B64U 2101/30* (2023.01); *B64U 2101/60* (2023.01); *B64U 2201/104* (2023.01); *B64U 2201/20* (2023.01); *G08G 5/045* (2013.01)

(58) Field of Classification Search
CPC ................ B64U 50/34; B64U 2101/30; B64U 2101/60; B64U 2201/104
See application file for complete search history.

(56) References Cited

U.S. PATENT DOCUMENTS

| | | | |
|---|---|---|---|
| 4,233,564 A | 11/1980 | Kerbel | |
| 4,507,558 A | 3/1985 | Bonne | |
| 4,988,833 A | 1/1991 | Lai | |
| 5,047,639 A | 9/1991 | Wong | |
| 5,075,619 A | 12/1991 | Said | |
| 5,173,749 A | 12/1992 | Tell et al. | |
| 5,291,265 A | 3/1994 | Kebabian | |
| 5,317,156 A | 5/1994 | Cooper et al. | |
| 5,767,780 A | 6/1998 | Smith et al. | |
| 5,822,058 A | 10/1998 | Adler-Golden et al. | |
| 6,064,488 A | 5/2000 | Brand et al. | |
| 6,295,859 B1 | 10/2001 | Hayden et al. | |
| 6,356,350 B1 | 3/2002 | Silver et al. | |
| 6,509,566 B1 | 1/2003 | Wamsley et al. | |
| 6,549,630 B1 | 4/2003 | Bobisuthi | |
| 7,162,933 B2 | 1/2007 | Thompson et al. | |
| 7,800,751 B1 | 9/2010 | Silver et al. | |
| 7,833,480 B2 | 11/2010 | Blazewicz et al. | |
| 8,060,270 B2 | 11/2011 | Vian et al. | |
| 8,294,899 B2 | 10/2012 | Wong | |
| 8,451,120 B2 | 5/2013 | Johnson, Jr. et al. | |
| 8,730,461 B2 | 5/2014 | Andreussi | |
| 9,183,371 B2 | 11/2015 | Narendra et al. | |
| 9,183,731 B1 | 11/2015 | Bokhary | |
| 9,235,974 B2 | 1/2016 | Johnson, Jr. et al. | |
| 9,250,175 B1 | 2/2016 | McManus | |
| 9,494,511 B2 | 11/2016 | Wilkins | |
| 9,599,529 B1 | 3/2017 | Steele et al. | |
| 9,599,597 B1 | 3/2017 | Steele et al. | |
| 10,023,311 B2 | 7/2018 | Lai et al. | |
| 10,023,323 B1 | 7/2018 | Roberts et al. | |
| 10,031,040 B1 | 7/2018 | Smith et al. | |
| 10,126,200 B1 | 11/2018 | Steele et al. | |
| 10,268,198 B2 | 4/2019 | Mantripragada et al. | |
| 10,325,485 B1* | 6/2019 | Schuster ................. G01S 7/497 | |
| 10,365,646 B1 | 7/2019 | Farnsworth et al. | |
| 10,429,546 B1 | 10/2019 | Ulmer | |
| 10,677,771 B2 | 6/2020 | Dittberner et al. | |
| 10,753,864 B2 | 8/2020 | Kasten et al. | |
| 10,816,458 B2 | 10/2020 | Kasten et al. | |
| 10,830,034 B2 | 11/2020 | Cooley et al. | |
| 10,962,437 B1* | 3/2021 | Nottrott ............. G01N 21/3504 | |
| 11,105,784 B2 | 8/2021 | Kukreja et al. | |
| 11,112,308 B2 | 9/2021 | Kreitinger et al. | |
| 11,275,068 B2 | 3/2022 | Willett | |
| 11,299,268 B2 | 4/2022 | Christensen et al. | |
| 11,519,855 B2 | 12/2022 | Black et al. | |
| 11,557,212 B2 | 1/2023 | Hong | |
| 11,614,430 B2 | 3/2023 | Buckingham et al. | |
| 11,619,562 B2 | 4/2023 | Leen et al. | |
| 11,710,411 B2 | 7/2023 | Van Meeteren et al. | |
| 11,748,866 B2 | 9/2023 | Vargas | |
| 2002/0005955 A1 | 1/2002 | Kramer et al. | |
| 2003/0160174 A1 | 8/2003 | Grant et al. | |
| 2003/0189711 A1 | 10/2003 | Orr et al. | |
| 2003/0230716 A1 | 12/2003 | Russell et al. | |
| 2004/0012787 A1 | 1/2004 | Galle et al. | |
| 2004/0017762 A1 | 1/2004 | Sogawa et al. | |
| 2004/0212804 A1 | 10/2004 | Neff et al. | |
| 2006/0015290 A1 | 1/2006 | Warburton et al. | |
| 2006/0044562 A1 | 3/2006 | Hagene et al. | |
| 2006/0232772 A1 | 10/2006 | Silver | |
| 2006/0234621 A1 | 10/2006 | Desrochers et al. | |
| 2007/0137318 A1 | 6/2007 | Desrochers et al. | |
| 2008/0169934 A1 | 7/2008 | Lang et al. | |
| 2008/0243372 A1 | 10/2008 | Bodin et al. | |
| 2009/0201507 A1 | 8/2009 | Kluczynski et al. | |
| 2009/0263286 A1 | 10/2009 | Isomura et al. | |
| 2009/0326792 A1 | 12/2009 | McGrath | |
| 2010/0004798 A1 | 1/2010 | Bodin et al. | |
| 2010/0131207 A1 | 5/2010 | Lippert et al. | |
| 2010/0140478 A1 | 6/2010 | Wilson et al. | |
| 2010/0147081 A1 | 6/2010 | Thomas | |
| 2011/0035149 A1 | 2/2011 | McAndrew et al. | |
| 2011/0074476 A1 | 3/2011 | Heer et al. | |
| 2011/0150035 A1 | 6/2011 | Hanson et al. | |
| 2011/0164251 A1 | 7/2011 | Richter | |
| 2011/0213554 A1 | 9/2011 | Archibald et al. | |
| 2011/0242659 A1 | 10/2011 | Eckles et al. | |
| 2011/0257944 A1 | 10/2011 | Du et al. | |
| 2012/0120397 A1 | 5/2012 | Furtaw et al. | |
| 2013/0044314 A1 | 2/2013 | Koulikov et al. | |
| 2013/0076900 A1 | 3/2013 | Mrozek et al. | |
| 2013/0208262 A1 | 8/2013 | Andreussi | |
| 2014/0172323 A1 | 6/2014 | Marino | |
| 2014/0204382 A1 | 7/2014 | Christensen | |
| 2014/0236390 A1 | 11/2014 | Mohamadi | |
| 2014/0336957 A1 | 11/2014 | Hanson et al. | |
| 2015/0072633 A1 | 3/2015 | Massarella et al. | |
| 2015/0145954 A1 | 5/2015 | Pulleti et al. | |
| 2015/0226575 A1 | 8/2015 | Rambo | |
| 2015/0275114 A1 | 10/2015 | Tumiatti et al. | |
| 2015/0295543 A1 | 10/2015 | Brown et al. | |
| 2015/0316473 A1 | 11/2015 | Kester et al. | |
| 2015/0323449 A1 | 11/2015 | Jones et al. | |
| 2015/0336667 A1 | 11/2015 | Srivastava et al. | |
| 2016/0018373 A1 | 1/2016 | Pagé et al. | |
| 2016/0070265 A1 | 3/2016 | Liu et al. | |
| 2016/0104250 A1* | 4/2016 | Allen ..................... G06Q 40/08 | |
| | | | 705/50 |
| 2016/0146696 A1 | 5/2016 | Steele et al. | |
| 2016/0161456 A1 | 6/2016 | Risk et al. | |
| 2016/0202225 A1 | 7/2016 | Feng et al. | |
| 2016/0214715 A1 | 7/2016 | Meffert | |
| 2016/0307447 A1 | 10/2016 | Johnson et al. | |
| 2016/0357192 A1 | 12/2016 | McGrew et al. | |
| 2017/0003684 A1 | 1/2017 | Knudsen et al. | |
| 2017/0057081 A1 | 3/2017 | Krohne et al. | |
| 2017/0089829 A1 | 3/2017 | Bartholomew et al. | |
| 2017/0093122 A1 | 3/2017 | Bean et al. | |

(56) References Cited

U.S. PATENT DOCUMENTS

| | | |
|---|---|---|
| 2017/0097274 A1 | 4/2017 | Thorpe et al. |
| 2017/0115218 A1 | 4/2017 | Huang et al. |
| 2017/0134497 A1 | 5/2017 | Harter et al. |
| 2017/0158353 A1 | 6/2017 | Schmick |
| 2017/0199647 A1 | 7/2017 | Richman et al. |
| 2017/0206648 A1 | 7/2017 | Marra et al. |
| 2017/0235018 A1 | 8/2017 | Foster et al. |
| 2017/0259920 A1 | 9/2017 | Lai et al. |
| 2017/0307519 A1 | 10/2017 | Black et al. |
| 2017/0336281 A1 | 11/2017 | Waxman et al. |
| 2017/0339820 A1 | 11/2017 | Foster et al. |
| 2018/0023974 A1 | 1/2018 | Otani et al. |
| 2018/0045561 A1 | 2/2018 | Leen et al. |
| 2018/0045596 A1* | 2/2018 | Prasad .................. G01M 3/22 |
| 2018/0050798 A1 | 2/2018 | Kapuria |
| 2018/0059003 A1 | 3/2018 | Jourdainne et al. |
| 2018/0067066 A1 | 3/2018 | Giedd et al. |
| 2018/0109767 A1 | 4/2018 | Li et al. |
| 2018/0122246 A1 | 5/2018 | Clark |
| 2018/0127093 A1 | 5/2018 | Christensen et al. |
| 2018/0188129 A1 | 7/2018 | Choudhury et al. |
| 2018/0259955 A1 | 9/2018 | Noto |
| 2018/0266241 A1 | 9/2018 | Ferguson et al. |
| 2018/0266946 A1 | 9/2018 | Kotidis et al. |
| 2018/0209902 A1 | 10/2018 | Myshak et al. |
| 2018/0284088 A1 | 10/2018 | Verbeck, IV |
| 2018/0292374 A1 | 10/2018 | Dittberner et al. |
| 2018/0321692 A1 | 11/2018 | Castillo-Effen et al. |
| 2018/0322699 A1 | 11/2018 | Gray et al. |
| 2019/0011920 A1 | 1/2019 | Heinonen et al. |
| 2019/0011935 A1 | 1/2019 | Ham et al. |
| 2019/0025199 A1 | 1/2019 | Koulikov |
| 2019/0033194 A1 | 1/2019 | DeFreez et al. |
| 2019/0049364 A1 | 2/2019 | Rubin |
| 2019/0077506 A1 | 3/2019 | Shaw et al. |
| 2019/0086202 A1 | 3/2019 | Guan et al. |
| 2019/0095687 A1 | 3/2019 | Shaw et al. |
| 2019/0154874 A1 | 5/2019 | Shams et al. |
| 2019/0178743 A1 | 6/2019 | McNeil |
| 2019/0195789 A1 | 6/2019 | Pan et al. |
| 2019/0204189 A1 | 7/2019 | Mohr, Jr. et al. |
| 2019/0212419 A1 | 7/2019 | Jeong et al. |
| 2019/0220019 A1 | 7/2019 | Tan et al. |
| 2019/0228573 A1 | 7/2019 | Sen et al. |
| 2019/0234868 A1* | 8/2019 | Tanomura .......... G01N 21/3504 |
| 2019/0331652 A1 | 10/2019 | Ba et al. |
| 2020/0050189 A1 | 2/2020 | Gu et al. |
| 2020/0109976 A1 | 4/2020 | Ajay et al. |
| 2020/0135036 A1 | 4/2020 | Campbell |
| 2020/0182779 A1 | 6/2020 | Kasten et al. |
| 2020/0249092 A1* | 8/2020 | Podmore ............... G01J 3/0205 |
| 2020/0400635 A1 | 12/2020 | Potyrailo et al. |
| 2021/0017926 A1 | 1/2021 | Alkadi et al. |
| 2021/0037197 A1 | 2/2021 | Kester et al. |
| 2021/0055180 A1 | 2/2021 | Thorpe et al. |
| 2021/0109074 A1 | 4/2021 | Smith et al. |
| 2021/0140934 A1 | 5/2021 | Smith et al. |
| 2021/0190745 A1 | 6/2021 | Buckingham et al. |
| 2021/0190918 A1 | 6/2021 | Li et al. |
| 2021/0199565 A1 | 7/2021 | John et al. |
| 2021/0247369 A1 | 8/2021 | Nottrott et al. |
| 2021/0255158 A1 | 8/2021 | Smith et al. |
| 2021/0300591 A1* | 9/2021 | Tian ......................... B64F 1/20 |
| 2021/0321174 A1 | 10/2021 | Sun et al. |
| 2021/0364427 A1 | 11/2021 | Smith et al. |
| 2021/0382475 A1 | 12/2021 | Smith et al. |
| 2022/0082495 A1 | 3/2022 | Kreitinger et al. |
| 2022/0113290 A1 | 4/2022 | Smith et al. |
| 2022/0268952 A1 | 8/2022 | Liang et al. |
| 2022/0341806 A1 | 10/2022 | Miller et al. |
| 2022/0357231 A1 | 11/2022 | Nahata et al. |
| 2023/0194487 A1 | 6/2023 | Buckingham et al. |
| 2023/0213413 A1 | 7/2023 | Mohr, Jr. et al. |
| 2023/0274651 A1 | 8/2023 | McGuire et al. |
| 2023/0392498 A1 | 12/2023 | Srivastav et al. |

FOREIGN PATENT DOCUMENTS

| | | |
|---|---|---|
| CN | 205749271 U | 11/2016 |
| CN | 106769977 A | 5/2017 |
| CN | 107703075 A | 2/2018 |
| CN | 211508182 U | 9/2020 |
| CN | 112213443 A | 1/2021 |
| DE | 29601472 U1 | 5/1996 |
| DE | 69333010 | 4/2004 |
| DE | 102014013822 A1 | 3/2016 |
| EP | 0450809 A2 | 10/1991 |
| EP | 1371962 B1 | 7/2011 |
| EP | 3339855 A1 | 6/2018 |
| FR | 3047073 B1 | 8/2019 |
| GB | 2538563 A | 11/2016 |
| IN | 109780452 A | 5/2019 |
| JP | H08247939 A | 9/1996 |
| JP | 200975823 A | 4/2009 |
| KR | 20170062813 A | 6/2017 |
| KR | 101770254 B1 | 8/2017 |
| TW | 522226 B | 3/2003 |
| WO | 1999054700 A2 | 10/1999 |
| WO | 02066950 A1 | 8/2002 |
| WO | 2008021311 A2 | 2/2008 |
| WO | 2015073687 A1 | 5/2015 |
| WO | 2016045791 A1 | 3/2016 |
| WO | 2016162673 A1 | 10/2016 |
| WO | 2017069979 A1 | 4/2017 |
| WO | 2018121478 A1 | 7/2018 |
| WO | 2018227153 A1 | 12/2018 |
| WO | 2019246280 A1 | 12/2019 |
| WO | 2020007684 A1 | 1/2020 |
| WO | 2020028353 A1 | 2/2020 |
| WO | 2020086499 A1 | 4/2020 |
| WO | 2020206006 A1 | 10/2020 |
| WO | 2020206020 A1 | 10/2020 |
| WO | 2021055902 A1 | 3/2021 |
| WO | 2021158916 A1 | 8/2021 |
| WO | 2022093864 A1 | 5/2022 |
| WO | 2022211837 A1 | 10/2022 |

OTHER PUBLICATIONS

International Search Report and Written Opinion for PCT/US2023/023933 mailed Sep. 26, 2023.

International Search Report and Written Opinion for PCT/US23/13893, mailed Jun. 30, 2023.

Lilian Joly, The evolution of AMULSE (Atmospheric Measurements by Ultra-Light Spectrometer) and its interest in atmospheric applications. Results of the Atmospheric Profiles of Greenhouse gasEs (APOGEE) weather balloon release campaign for satellite retrieval validation, p. 1-28, Sep. 25, 2019, Atmospheric Measurement Techniques Discussion (Joly).

Clilverd, Mark A. et al., Energetic particle injection, acceleration, and loss during the geomagnetic disturbances which upset Galaxy 15, Journal of Geophysical Research, vol. 117, A12213, doi: 10.1029/2012JA018175, 2012, pp. 1-16 (Year:2012).

Kem, Christoph et al., Spatial Distribution of Halogen Oxides in the Plume of Mount Pagan Volcano, Mariana Islands, Geophysical Research Letters 10.1029/2018GL079245, Sep. 27, 2018, pp. 9588-9596 (Year:2018).

Liao, J. et al. Observations of Inorganic bromine(HOBr, BrO, and Br2) speciation at Barrow, Alaska in spring 2009, Journal of Geophysical Research, vol. 117, D00R16, doi:10.1029/2011JD016641, 2012, pp. 1-11 (Year:2012).

Liu, Siwen et al., Development of a UAV-Based System to Monitor Air Quality over an Oil Field, Montana Technological University, Montana tech Library Digital Commons @ Montana Tech Graduate Theses & Non-Theses, Fall 2018, pg(s) 1-85 (Year:2018).

Miyama, Toru et al., Estimating allowable carbon emission for CO2 concentration stabilization using a GCM-based Earth system model, Geophysical Research Letters, vol. 36,L19709, doi:10.1029/2009GL039678, 2009, pp. 0094-8276 (Year:2009).

Oppenheimer Clive et al., Ultraviolet Sensing of Volcanic Sulfur Emissions, Elements (An Internatioknal Magazine of Mineralogy, Geochemistry, and Petrology), Apr. 2010, vol. 6, pp. 87-92 (Year: 2010).

(56) References Cited

OTHER PUBLICATIONS

Parazoo, Nicholas C. et al., Interpreting seasonal changes in the carbon balance of southern Amazonia using measurements of XCO2 and chlorophyll fluorescence from Gosat, Geophysical Research Letters, vol. 40.2829-2833, doi: 10.1002/grl.50452, 2013 pg(s0 2829-2833 (Year:2013).

Queiber, Manuel et al., A new frontier in CO2 flux measurements using a highly portable DIAL laser system, Scientific Reports, DOI: 10.1038/srep33834 1, Sep. 22, 2016, pp. 1-13(Year:2016).

Queiber, Manuel et al., Large-area quantification of subaerial CO2 anomalies with portable laser remote sensing and 2d tomography, The Leading Edge Mar. 2018, pp. 306-313 (Year:2018).

International Search Report for PCT/US20/44978 mailed Oct. 26, 2020.

International Search Report and Written Opinion for PCT/US22/38951, mailed Nov. 28, 2022.

Kelly J F et al. "A capillary absorption spectrometer for stable carbon isotope ratio (C/C) analysis in very small samples", Review of Scientific Instruments, American Institute of Physics, 2 Huntington Quadrangle, Melville, NY 11747, vol. 83, No. 2, Feb. 1, 2012 (Feb. 1, 2012), pp. 23101-23101, XP012161835, ISSN: 0034-6748, DOI: 10.1063/1.3680593.

Krings et al., Atmos. Meas. Tech., 11, 721-739, Feb. 7, 2018.

U.S. Appl. No. 62/687,147, filed Jun. 19, 2018, Brendan James Smith.

"SAFESITE Multi-Threat Detection System", Jul. 11, 2012 (Jul. 11, 2012), pp. 1-6, XP055245980.

International Search Report and Written Opinion for PCT/US19/38011 mailed Sep. 9, 2019.

International Search Report and Written Opinion for PCT/US19/38015, mailed Oct. 18, 2019.

International Search Report and Written Opinion for PCT/US19/44119, mailed Oct. 17, 2019.

International Search Report and Written Opinion for PCT/US20/26228 mailed Jul. 1, 2020.

International Search Report and Written Opinion for PCT/US20/26232 mailed Jun. 26, 2020.

International Search Report and Written Opinion for PCT/US20/26246 mailed Jun. 29, 2020.

International Search Report and Written Opinion for PCT/US20/51696, mailed Feb. 3, 2021.

International Search Report and Written Opinion for PCT/US2021/016821 mailed Apr. 26, 2021.

International Search Report and Written Opinion for PCT/US2021/024177, mailed Jun. 23, 2021.

International Search Report and Written Opinion for PCT/US2021/056708, mailed Jan. 27, 2022.

International Search Report and Written Opinion for PCT/US21/42061, mailed Nov. 26, 2021.

International Search Report and Written Opinion for PCT/US21/44532, mailed Jan. 11, 2022.

International Search Report and Written Opinion for PCT/US21/56710, mailed Feb. 23, 2022.

International Search Report and Written Opinion of PCT/US19/57305, mailed Jan. 2, 2020.

International Search Report and Written Opinion of PCT/US20/54117, mailed Dec. 22, 2020.

Joly, "Atmospheric Measurements by Ultra-Light Spectrometer (AMULSE) Dedicated to Vertical Profile In Situ Measurements of Carbon Dioxide (CO2) Under Weather Balloons: Instrumental Development and Field Application," Sensors 2016, 16, 1609.

Khan, "Low Power Greenhouse Gas Sensors for Unmanned Aerial Vehicles", Remote Snse. 2012, 4, 1355-1368.

Villa. "An Overview of Small Unmanned Aerial Vehicles for Air Quality Measurements: Present Applications and Future Prospectives". Sensors. Web . Jul. 12, 2016.

White, "Development of an Unmanned Aerial Vehicle for the Measurement of Turbulence in the Atmospheric Boundary Layer", Atmosphere, v.8, issue 10, 195, pp. 1-25.

Feng, Lingbing, Nowak, Gen, O'Neill, T.J., Welsh, A.H. "Cutoff; A spatio-temporal imputation method." Journal of Hydrology 519 (2014) : 3591-3605 (Year:2014).

Cabreira et al. "Survey on Coverage Path Planning with Unmanned Aerial Vehicles", published: Drones, published: Jan. 2019, pp. 1-38, year 2019.

International Search Report and Written Opinion for PCT/US23/23905 mailed Oct. 5, 2023.

Development of a mobile tracer correlation method for assessment of air emissions from landfills and other area sources, Atmospheric Environment 102 (2015) 323-330. T.A. Foster-Wittig et al. 2015.

Measurements of Methane Emissions from Landfills Using a Time Correlation Tracer Method Based on FTIR Absorption Spectroscopy, Environ. Sci. Technol. 2001, 35, 21-25, B. Galle et al. 2001.

Uehara, K: "Dependence of harmonic signals 1-15 on sample-gas parameters in wavelength-modulation spectroscopy for precise absorption measurements", Applied Physics B, Springer Berlin Heidelberg, Berlin/Heidelberg, vol. 67, Jan. 2, 1998, pp. 517-523, XP007921671, ISSN:0946-2171, DOI: 10.1007/S003400050537.

Adame J A et al: "Application of cluster analysis to surface ozone, NOand SOdaily patterns in an industrial area in Central-Southern Spain measured with a DOAS system", Science of the Total Environment, Elsevier, Amsterdam, NL, vol. 429, Apr. 11, 2012 (Apr. 11, 2012), pp. 281-291, XP028491183, ISSN: 0048-9697, DOI: 10.1016/J.SCITOTENV.2012.04.032.

Field Trial of Methane Emission Quantification Technologies, Society of Petroleum Engineers, SPE-201537-MS, Allen et al., Oct. 2020.

\* cited by examiner

RAPIDLY DEPLOYABLE UAS SYSTEM FOR AUTONOMOUS INSPECTION OPERATIONS USING A COMBINED PAYLOAD

CROSS-REFERENCE TO RELATED APPLICATION

This application is a 35 U.S.C § 371 National Stage Entry of International Application No. PCT/US2020/44978, filed Aug. 5, 2020, which claims the priority benefit of U.S. Provisional Patent Application Ser. No. 62/883,026, filed Aug. 5, 2019 and Patent Cooperation Treaty (PCT) Application Number PCT/US2020/026246, filed Apr. 1, 2020, all of which are incorporated herein by reference in their entirety for all purposes.

FIELD OF ENDEAVOR

The invention relates generally to gas measurement, and more particularly to Unmanned Aerial System (UAS) gas infrastructure inspection.

BACKGROUND

Methane (CH4) is an odorless and colorless naturally occurring organic molecule, which is present in the atmosphere at average ambient levels of approximately 1.85 ppm as of 2018 and is projected to continually climb. Methane is a powerful greenhouse gas, a source of energy (i.e., methane is flammable), and an explosion hazard, and so detection of methane is of utility to scientists as well as engineers. While methane is found globally in the atmosphere, a significant amount is collected or "produced" through anthropogenic processes including exploration, extraction, and distribution of petroleum resources as a component in natural gas. Natural gas, an odorless and colorless gas, is a primary fuel used to produce electricity and heat. The main component of natural gas is typically methane, and the concentration of methane in a stream of natural gas can range from about 70% to 90%. The balance of the gas mixture in natural gas consists of longer chain hydrocarbons, including ethane, propane, and butane, typically found in diminishing mole fractions that depend on the geology of the earth from which the gas is extracted. Once extracted from the ground, natural gas is processed into a product that must comply with specifications for both transport, taxation, and end-use in burners; specification of processed 'downstream' natural gas product control for the composition of the gas, so as to protect transport lines from corrosion and ensure proper operation of burners and turbines. While extraction of natural gas is one of the main sources of methane in the atmosphere, major contributors of methane also include livestock farming (i.e., enteric fermentation) and solid waste and wastewater treatment (i.e., anaerobic digestion). Anaerobic digestion and enteric fermentation gas products consist primarily of methane and lack additional hydrocarbon species.

SUMMARY

A system embodiment may include: a mobile vehicle, the mobile vehicle comprising a base station; an unmanned aerial vehicle (UAV), where the UAV may be launched from the base station; a payload disposed on the UAV, where the payload may be configured to generate payload data of at least one infrastructure, and where the payload data comprises at least one of: a gas sensor data, an infrared imager for optical gas imaging (OGI) camera data, an infrared imager tuned for radiometric measurement camera data, a visible camera data, and a 3D mapping data; a processor in communication with the UAV and the payload, where the processor may be configured to determine an integrity of the at least one infrastructure based on payload data from the payload.

Additional system embodiments may include: a ground control station (GCS) in communication with the UAV and the payload, wherein the processor of the GCS is configured to determine an integrity of the at least one infrastructure based on payload data from the payload. In additional system embodiments, the processor is at least one of: a payload processor, a GCS processor, and a cloud server. In additional system embodiments, the base station comprises a ground control station (GCS) in communication with the UAV and the payload. In additional system embodiments, the infrared imager is an imager tuned to mid-wavelength infrared (MWIR). In additional system embodiments, the infrared imager is an imager tuned to long-wavelength infrared (LWIR). In additional system embodiments, the 3D mapping data is LIDAR data.

Additional system embodiments may include a remote command and control station located distal from the base station. Additional system embodiments may include a remote command and control station located proximate the base station.

Additional system embodiments may include: a cloud server, where the cloud server may be configured to receive the payload data and the determined integrity of the at least one infrastructure. In additional system embodiments, the base station may be a permanent structure including: a dashboard configured to display data from at least one of: the payload and the UAV; and a transceiver configured to communicate with at least one of: the UAV, the payload, and the GCS. In additional system embodiments, the base station may be a temporary structure including: a dashboard configured to display data from at least one of: the payload and the UAV; and a transceiver configured to communicate with at least one of: the UAV, the payload, and the GCS. In additional system embodiments, the base station may be a mobile vehicle including: a dashboard configured to display data from at least one of: the payload and the UAV; and a transceiver configured to communicate with at least one of: the UAV, the payload, and the GCS. In additional system embodiments, the mobile vehicle may be a field truck. In additional system embodiments, the UAV may be a vertical takeoff and landing (VTOL) UAV.

In additional system embodiments, the base station may further include an all-weather enclosure to protect the UAV from the elements when the UAV may be within the base station. In additional system embodiments, the all-weather enclosure may further include a telescope hood.

In additional system embodiments, the base station further comprises a power system for recharging the UAV when the UAV may be within the base station. In additional system embodiments, the base station further comprises a data system for data transfer between the UAV and the base station when the UAV may be within the base station. In additional system embodiments, the payload further comprises at least one of: one or more gas sensors, an optical gas imaging (OGI) camera, a visible camera, a thermal infrared camera, vibration isolation, a processor having addressable memory, and a light detection and ranging (LIDAR) sensor. In additional system embodiments, the payload further comprises one or more gas sensors, an optical gas imaging (OGI) camera, a visible camera, a thermal infrared camera, vibration isolation, a processor having addressable memory, and a light detection and ranging (LIDAR) sensor.

A method embodiment may include: launching an unmanned aerial vehicle (UAV) from a base station, where the base station may be disposed on a mobile vehicle; generating, by a payload on the UAV, payload data of at least one infrastructure, where the payload data comprises at least one of: a gas sensor data, an infrared imager for an optical gas imaging (OGI) camera data, an infrared imager tuned for radiometric measurement camera data, a visible camera data, and a LIDAR data; streaming, by at least one transmitter, the generated payload data to a ground control station (GCS) in near real-time; and determining, by a processor of the GCS, an integrity of the at least one infrastructure based on the streamed payload data.

Additional method embodiments may include displaying, via a dashboard of the GCS, the determined integrity of the at least one infrastructure. Additional method embodiments may include landing the UAV at the base station. Additional method embodiments may include recharging, via a power system, the landed UAV at the base station.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
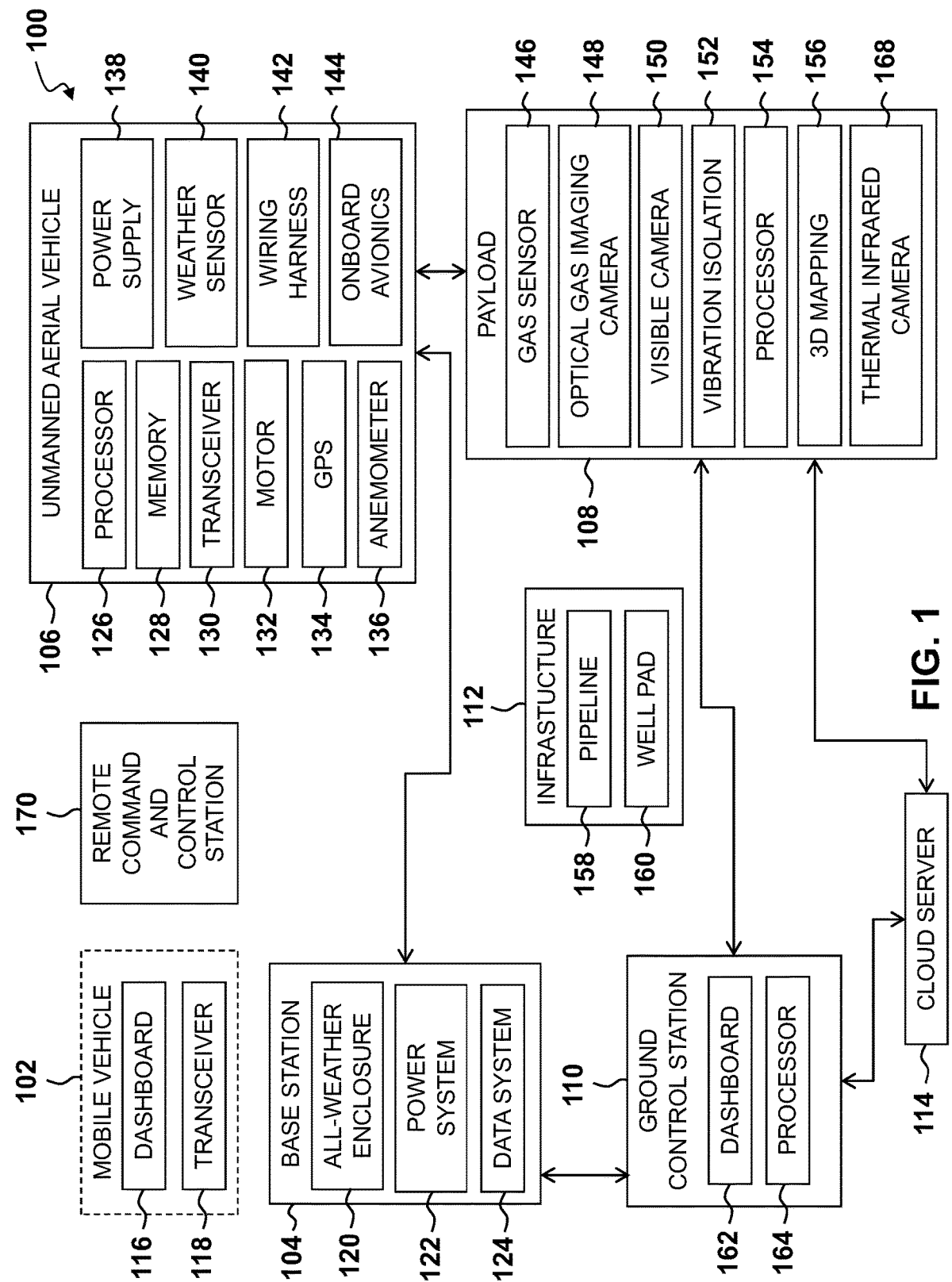
FIG. 1 depicts a high-level block diagram of an unmanned aerial system (UAS) gas infrastructure inspection system, according to one embodiment.

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

The present system allows for determining the integrity of gas infrastructure based on streamed payload data from a payload attached to an unmanned aerial vehicle (UAV). The UAV may be transported via a base station on a vehicle. The UAV, base station, and/or mobile vehicle may stream payload data to a dashboard of a ground control station (GCS) for processing, analysis, and the determination of any corrective actions.

The disclosed system may include a Fully Autonomous Resident Robotic Unmanned Aerial System (FARR-UAS). The FARR-UAS provides unparalleled capabilities for persistent observations by coupling an instrumented "intelligent" long-range electric multi-rotor UAS with a base station providing power, communications, and recharging capabilities. An advanced sensor payload provides capabilities for high-resolution visible imaging, 3D terrain mapping, gas sensing, and multi-spectral imaging if needed. In some embodiments, the system may operate as a fully autonomous system resident to an oilfield to persistently survey oilfield well pads, facilities, and infrastructure.

The disclosed system meets routine asset inspection needs. The disclosed system may implement a fully autonomous robotic monitoring system that leverages state-of-the-art technologies such as machine vision/learning, unmanned aerial systems (UAS), miniature laser spectrometers, and/or spectral imaging.

The disclosed system detects asset integrity compromises prior to failure or shortly after impact is realized on production and/or the environment. Such asset integrity failures could result in produced water leakage (e.g., pipelines), crude oil leakage (e.g, pipelines), and/or gas leaks (e.g., production components, facilities, and/or pipelines). Asset integrity concerns range from pipeline integrity to individual components and infrastructure.

The disclosed sensor-equipped UAS provides for regular autonomous inspection of pipelines and infrastructure, up to several times per day. UAS provide savings of time and resources for routine inspection tasks. The disclosed efficient data acquisition and rapid interpretation utilizes the disclosed systems to efficiently replace labor-intensive human inspection operations, increase accuracy, and the like. The disclosed resident robotic system meets routine asset integrity inspection needs for the production and transmission environments. The disclosed system meets diverse and rigorous inspection requirements for pipeline and production components, which impacts the selection of an appropriate UAS and sensor payload to meet mission requirements for long-linear and precision inspection operations.

FIG. 1 depicts a high-level block diagram of an unmanned aerial system (UAS) gas infrastructure inspection system 100, according to one embodiment. The system 100 may include a mobile vehicle 102; a base station 104; an unmanned aerial vehicle (UAV) 106 launched from the base station 104; a payload 108 connected to the UAV 106; a ground control station (GCS) 110 that receives payload data from the payload 108 relating to infrastructure 112; and a cloud server 114 that may receive payload data from the GCS 110 and/or the payload 108.

The mobile vehicle 102 may include a dashboard 116, transceiver 118, and base station 104. In some embodiments, the mobile vehicle 102 may utilize a receiver and transmitter in place of, or in addition to, the transceiver 118. The mobile vehicle 102 may be a modified field truck in some embodiments. The mobile vehicle 102 may be a mobile base station that allows for deployment of at least one UAV 106. The setup and launch time of the UAV 106 and associated payload 108 from the mobile vehicle 102 may be minimal. In some embodiments, the setup and launch time may be less than 5 minutes. In some embodiments, the UAV 106 may be a vertical takeoff and landing (VTOL) UAV. The UAV 106 may be able to fly an autonomous mission around a single infrastructure 112, such as a well pad 160 or pipeline 158. A well pad 160 is the area that has been cleared for a drilling rig to work on a plot of land designated for natural gas or oil extraction. The well pad 160 is constructed by clearing all trees and obstacles to allow for engineering of a foundation usually made of local rock from a quarry. In some embodiments, the system 100 may survey a plurality of well pads 160 with the disclosed payload 108. In some embodiments, the system 100 may survey one or more infrastructure locations 112 that may be located a long-range distance from the mobile vehicle 102 launch point. While a pipeline 158 and well pad 160 are included as examples of infrastructure 112, other types of infrastructure are possible and contemplated. In some embodiments, the UAV 106 may launch from a first location and land at a second location. For example, the mobile vehicle 102 may maneuver from the first location to the second location to allow for surveying additional infrastructure 112 locations without increasing power capacity or decreasing weight of the UAV 106 and/or payload 108.

The dashboard 116 may include a display, user interface, processor, addressable memory, or the like. The dashboard 116 may provide an ability to view and/or analyze data from the payload 108 and/or UAV 106. In some embodiments, the dashboard 116 may be an in-cabin dashboard with real-time data analysis and reporting. In other embodiments, the dashboard 162 may be remote from the mobile vehicle 102.

The transceiver 118 may allow the mobile vehicle 102 and/or base station 104 to communicate with the UAV 106; payload 108; GCS 110; and/or cloud server 114. In some embodiments, the transceiver 118 may be a transmitter or other communication device or system.

Figure 5A:
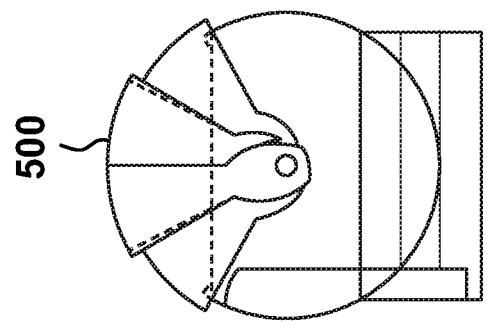
FIGS. 5A-5C depict all-weather enclosures for transporting, providing power to, and transferring data to or from the UAV, according to one embodiment.
Figure 5B:
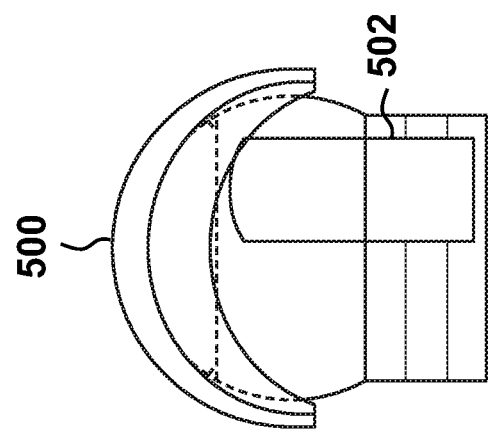
Figure 5C:
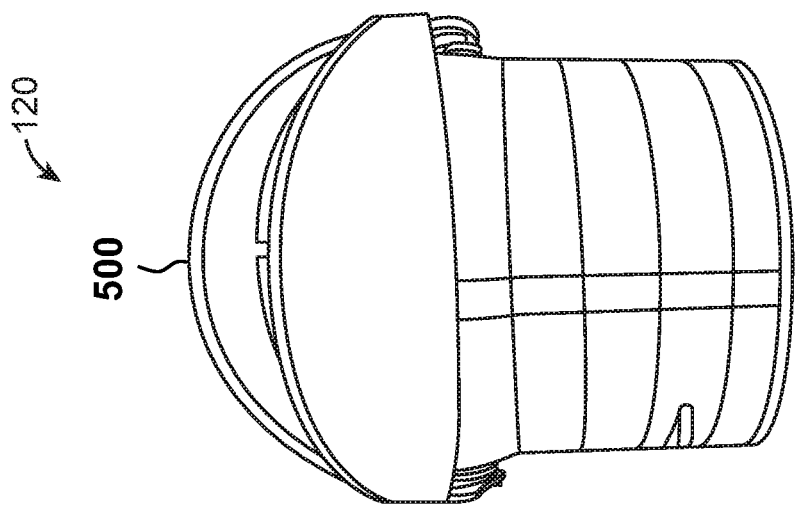

The base station 104 may include an all-weather enclosure 120, a power system 122, and a data system 124. The all-weather enclosure 120 may protect the UAV 106 from the elements when the UAV 106 is within the base station 104, such as prior to surveying infrastructure 112 or after completing an infrastructure 112 mission. In some embodiments, the all-weather enclosure 120 may be a retractable hood, such as shown in FIGS. 5A-5C. In some embodiments, the all-weather enclosure 120 may include one or more motors, processors, memory, or the like. In one embodiment, the all-weather enclosure 120 may include a moveable element, such as a door, that may be opened and closed to allow the UAV 106 to leave or enter the base station 104. In some embodiments, the base station 104 may be a permanent structure, such as a structure that is not attached to a mobile vehicle 102. In some embodiments, the base station 104 may be a temporary structure, such as a structure that is not attached to a mobile vehicle 102. In some embodiments, the base station 104 may be a mobile vehicle 102, such as a field truck. In some embodiments, the mobile vehicle 102 may not be needed, such as when the base station 104 is a permanent structure.

The power system 122 may provide power to the UAV 106 prior to a mission and/or recharge the UAV 106 after a mission. In one embodiment, the power system 122 may include one or more batteries. In some embodiments, the power system 122 may be powered by the mobile vehicle 102, an external power source such as solar panels on the mobile vehicle 102, or the like. The power system 122 may be disposed in the bottom of the base station 104 in some embodiments. The power system 122 may include the following components: a power brick for recharging; recharging hardware, such as solar panels for remote installation or line power; and autonomous recharging station, such as a UAV landing area; and a data communications system, such as a supervisory control and data acquisition (SCADA) network compatible system. In some embodiments, the recharging system may be autonomous. The UAV 106 and payload 108 may be coupled with the base station 104 for launch/recovery, command/control, recharging, and/or data transfer. The persistence requirement for the UAV may be a 2-hour flight time to allow for operations at long-distance away from the base station, in some embodiments. An all-electric UAS may provide capability for autonomous recharging at the base station 104 following mission completion. Using the disclosed all-electric UAS as compared to a hybrid electric/gas-powered UAS may avoid the need to require refueling operations which may require intervention and unnecessary risk for field personnel.

The data system 124 may allow for the transfer of data between the UAV 106 and the base station 104. In some embodiments, the data system 124 may transfer mission information, such as a flight plan, to the UAV 106 prior to a mission. In some embodiments, the data system 124 may receive payload data from the UAV 106 after completion of a mission.

The UAV 106 may include a processor 126 in communication with addressable memory 128, a transceiver 130, one or more motors 132, a global positioning system (GPS) 134, an anemometer 136, a power supply 138, a weather sensor 140, a wiring harness 142, and/or onboard avionics 144. The processor 126 may store a flight plan, control the vehicle via interaction with the GCS 110, control the vehicle via semi-autonomous control, and/or control the vehicle via autonomous control. The processor may also process payload data from the payload 108 in some embodiments.

The disclosed UAV 106 may be outfitted for the emissions sensor payload 108; may have a flight time of greater than 1 hour; may have an emissions monitoring UAS payload 108 with associated real-time data analysis algorithms; and/or may be fully autonomous. The UAV 106 may be a standard UAS; have an endurance of about 120 minutes; may be vertical take-off and landing (VTOL) capable; may have a range of about 80 km; may have mission profiles for precision flights and long-linear; and/or may have a cruising altitude greater than 15 feet. Many inspection scenarios may require flight at low altitude and the expanded flight envelope for multi-rotor systems can accomplish this while fixed-wing systems are typically operated at 200-300 feet Above Ground Level (AGL).

In some embodiments, the UAV 106 may be a multi-rotor, a transition vehicle, and/or a fixed-wind vehicle. A transition vehicle is a hybrid system that includes propellers for vertical takeoff and landing built around a fixed-wing platform for gliding over distance. A fixed-wing vehicle may offer the highest range for any platform, offering maximum flight times of 5-hours (~300 km linear range), but may require a far greater cruising altitude than other vehicles. The UAV 106 may be a VTOL system for launch and/or recovery; may have a desired range of at least 80 km, which may increase with new technology; may require base station 104 recharging capabilities, such as rapid recharging from a power system 122; may have a capability for low-altitude operations, such as less than 20 meters minimum altitude; and/or may have an autonomous hazard detection & avoidance system, such as via onboard avionics 144. The disclosed system may provide capabilities to autonomously operate from a resident base station 104 and/or GCS 110 and routinely inspect well pads 160, components, storage tanks, facilities, and pipelines 158 within a range of about 40 km from the base station 104.

The UAV 106 and payload 108 may be enclosed in the all-weather outdoor enclosure 120 of the base station 104, within which the autonomous UAS and power system 122 reside. The autonomous missions may be conducted at regular frequency from the base station 104, which may offer required communications protocols and recharging capability via the transceiver 118, power system 122, and data system 124.

The VTOL-capable UAV 106 may be capable of autonomous launch and recovery. In some embodiments, the UAV 106 may hover in place for data capture from a fixed point at different viewing angles and operations across a wide range of altitudes for high-resolution inspection.

In one embodiment, the UAV 106 may have external dimensions of about 26 inches by 26 inches without propellers; an unladen weight of about 6.5 kg; a payload capacity of about 1.5 kg; a max flight time of up to 2 hours; a recharge time of about 1 hour for a 50% mission flight time; a max speed of about 19 meters per second (45 mph); a max distance of about 80 km; and/or a charge time of about 1 hour. The UAV 106 may utilize lithium ion batteries within the flight frame to increase flight time. Alternate dimensions and specifications of the UAV 106 are possible and contemplated.

The transceiver 130 may be in communication with the payload 108, the mobile vehicle 102, the GCS 110, and/or the cloud server 114. In some embodiments, the transceiver 130 may be a transmitter or other communication device or system.

The one or more motors 132 may drive one or more propellers. In some embodiments, there may be four motors in a quadcopter-style UAV 106 configuration.

The GPS 134 may determine the position of the UAV 106 for following a flight plan, determining a location of the infrastructure 112, and/or for including in the payload data from the payload 108.

The anemometer 136 may be used to measure a wind speed proximate the UAV 106 location and/or payload data. The wind speed measurement from the anemometer may be used with the payload data to determine a source location of an elevated ambient gas concentration. In some embodiments, the system 100 may use wind speed from a third party source, an external anemometer, another UAV having an anemometer, and/or wind forecasts.

The power supply 138 may be used to provide power to the motors 132, payload 108, and/or other systems and components of the UAV 106. The mission distance and/or flight time may be limited by the available power of the power supply 138.

The wiring harness 142 may provide for power and/or data transmission on the UAV 106 and/or payload 108.

Onboard avionics 144 may be used to determine the UAV 106 location, orientation, and the like. In some embodiments, the onboard avionics may be used as part of a sense and avoid system to avoid obstacles and/or infrastructure 112 during the flight missions. The sense and avoid system may utilize autonomous flight path retasking (hazard avoidance).

The payload 108 may include one or more gas sensors 146, an optical gas imaging (OGI) camera 148, a visible camera 150, vibration isolation 152, a processor 154 having addressable memory, and/or a light detection and ranging (LIDAR) sensor. While various components are shown and described, it is contemplated that the elements of the UAV 106 and payload 108 may be interchanged and/or duplicated based on the needs of the system. For example, the UAV 106 location from the GPS 134 may be sent to the payload 108 for inclusion in the payload data in some embodiments. In other embodiments, the payload 108 may include a separate or redundant GPS or location sensor. In some embodiments, payload 108 may include a methane (CH4) and/or carbon dioxide (CO2) sensor, such as the SeekIR sensor by SeekOps Inc. of Austin, Texas. The processor 154 may perform onboard processing for data fusion and/or transmission. The processor 154 requirements may be based upon required computing power, communication ports, power consumption, size, and the like. In some embodiments, the processor 154 may be used to determine infrastructure integrity. In some embodiments, the payload processor 154, GCS processor 164, and/or cloud server 114 may be configured to determine integrity to a set confidence bound. For example, the payload processor 154 may determine integrity to a lower confidence bound due to lower processing ability while the cloud server 114 may determine integrity to a higher confidence bound due to higher processing ability. In some embodiments, the payload processor 154 may be configured to fuse data from two or more sensors 146, 148, 150, 156, 168 of the payload 108.

The gas sensor 146 may be used to determine an elevated ambient gas concentration. Elevated ambient gas concentrations may be used to determine a gas leak and/or a source of the gas leak.

The OGI camera 148 may be used to detect a presence of certain gasses such as propane (C3H8), methane (CH4), ethylene (C2H4), and the like. In one embodiment, the OGI camera may be the Ventus OGI by Sierra-Olympic Technologies, Inc. of Hood River, Oregon. In some embodiments, the OGI camera may be an infrared imager, such as an infrared imager tuned to mid-wavelength infrared (MWIR) or long-wavelength infrared (LWIR) for generating optical gas imaging (OGI) camera 148 data.

The visible camera 150 may be an RGB camera. The visible camera 150 may provide visual context for the other payload data generated by the payload 108. For example, the UAV mission may be surveying infrastructure 112 such as a pipeline 158, a well pad 160, or the like. If elevated ambient gas is detected by the gas sensor 146 and/or OGI camera 148, then a video feed or still image from the visible camera 150 may allow an operator, or a machine-learning computer, to determine the source and/or location of the gas. For example, the source of the gas may be a gas leak in the pipeline 158 captured by the visible camera 150.

The payload 108 may include vibration isolation 152 in some embodiments to increase the accuracy of payload data, reduce errors, avoid damage to the components of the payload 108, or the like. The combined payload 108 weight and power consumption may be within set aircraft specifications. The vibration isolation 152 may be a housing that protects all of the sensors 146, 148, 150, 156, 168 from light shock and dust and ensures proper vibration isolation.

The payload may include a LIDAR. The LIDAR may be used to image a ground location, such as gas infrastructure 112.

The GCS 110 may include a dashboard 162 and a processor 164 in communication with addressable memory. Payload data may be streamed from the payload 108 to the GCS 110 in real-time or near real-time. The payload data may include gas emissions data. The dashboard 162 may be used to display payload data from the payload 108 and/or UAV 106. This system 100 may serve as the robotic Leak Detection Technician, function as the inspection companion tasked with executing repetitive and/or dangerous tasks, and filter raw data into an easily digestible information for high-level decision-making. The disclosed robotic labor assistance (co-robotics) is an ideal use-case for UAS and autonomous data analysis in the workplace—assisting in low to mid-level tasks, leaving high-level assessment and decision making to the operators, such as via the dashboard 162 of the GCS 110.

In some embodiments, a remote command and control ground station 170 may be disposed distal from the base station 104. In other embodiments, the remote command and control ground station 170 may be disposed proximate the base station 104. The remote command and control ground station 170 may be used to control the UAV 106 and/or payload 108. The remote command and control ground station 170 may receive data from the UAV 106 and/or payload 108. In some embodiments, the base station 104 may include the ground control station 110.

In some embodiments, the system 100 may be used to analyze well pad slope stability using high-resolution visible camera 150 and 3D Mapping 156 sensing, such as LIDAR, for assessment of 3D reconstruction efficacy. The Well Pad Slope Analysis may use a Hi-Res Visible Dataset which may include Visible Stills/Videos; 2D Orthomosaic Maps; and 3D Maps (SFM). A Colorized LIDAR Dataset may include 3D surface point clouds, and Surface classifications. Sensors for slope analysis may include a Sony A7R II Camera by Sony Corporation of Konan, Minato, Tokyo. The camera 150 may have a resolution of 42.4 MP; mirrorless; capable of stills +4K video; image-stabilized; and/or CMOS full-frame. Another sensor for slope analysis may include a Velodyne HDL-32e by Velodyne Lidar of San Jose, California. The 3D mapping sensing 156 may be a compact LIDAR; 32 Channels; dual returns; <5 cm accuracy; and 100 m range. Other visible cameras 150 and 3D mapping sensing 156 sensors are contemplated and possible. In some embodiments, the system may use a thermal infrared camera 168 tuned for radiometric measurement camera data.

In some embodiments, the system 100 may be used to inspect methane flare stack and fugitive methane emissions (FME) from various infrastructure 112 sources. The Flare Stack/FME may use Methane OGI imagery including Stills/Videos; Methane in situ Data; Concentration maps; Anomaly Detection; Anomaly Locations; and/or Quantitative Leak Rates. The sensors for flare stack/FME may include the Ventus OGI by Sierra-Olympic Technologies, Inc, of Hood River, Oregon. The camera 150 may be lightweight, have Midwave-IR; 3.2-3.4 µm; and 640×512 FPA. Sensors for flare stack/FME may also use a SeekIR In Situ Sensor from SeekOps Inc. of Austin, Texas. The gas sensor 146 may be lightweight; 10-ppb sensitivity; 10 Hz Cadence; Accurate; and/or Quantitative. Other visible cameras 150 and gas sensors 146 are contemplated and possible.

The GCS 110 may be used to display real-time processed data on the dashboard 162. The dashboard 162 may provide live visual video for data context. In some embodiments, the dashboard 162 may be a web-hosted Dashboard for data visualization with one or more of the following features: Displaying the UAV's 106 current position and status; the ability to display raw payload values from each sensor (e.g., 4 in total); and the ability to display real-time processed data in an easy to interpret form. Data Analytics Algorithms may process the emissions data in near-real-time for view on the dashboard 162. Data analysis algorithms for the emissions payload may provide a data visualization dashboard for real-time data; and a unique data presentation dashboard to rapidly display actionable information in real-time. This increased data and actionable steps provide increased emissions monitoring efficacy and overall infrastructure 112 safety using the developed payload.

In some embodiments, the dashboard 162 may provide real-time visualization and presentation research; provide information that is useful for display and logging; OGI real-time processing algorithms; CH4+CO2 real-time processing algorithms; dynamic retasking; automatically ingesting and storing data received at the GCS 110; algorithms that can autonomously on the backend of the dashboard; moving and storing data in the cloud server 114; real-time video data overlay; user access and/or security; restricting data and portal access based on credentials; and/or machine vision/learning.

The cloud server 114 may be in communication with the GCS 110, payload 108, UAV 106, and/or mobile vehicle 102. The cloud server 114 may perform additional processing on the payload data, store the payload data in at least one database, compare payload data to historical payload data, or the like.

Figure 2:
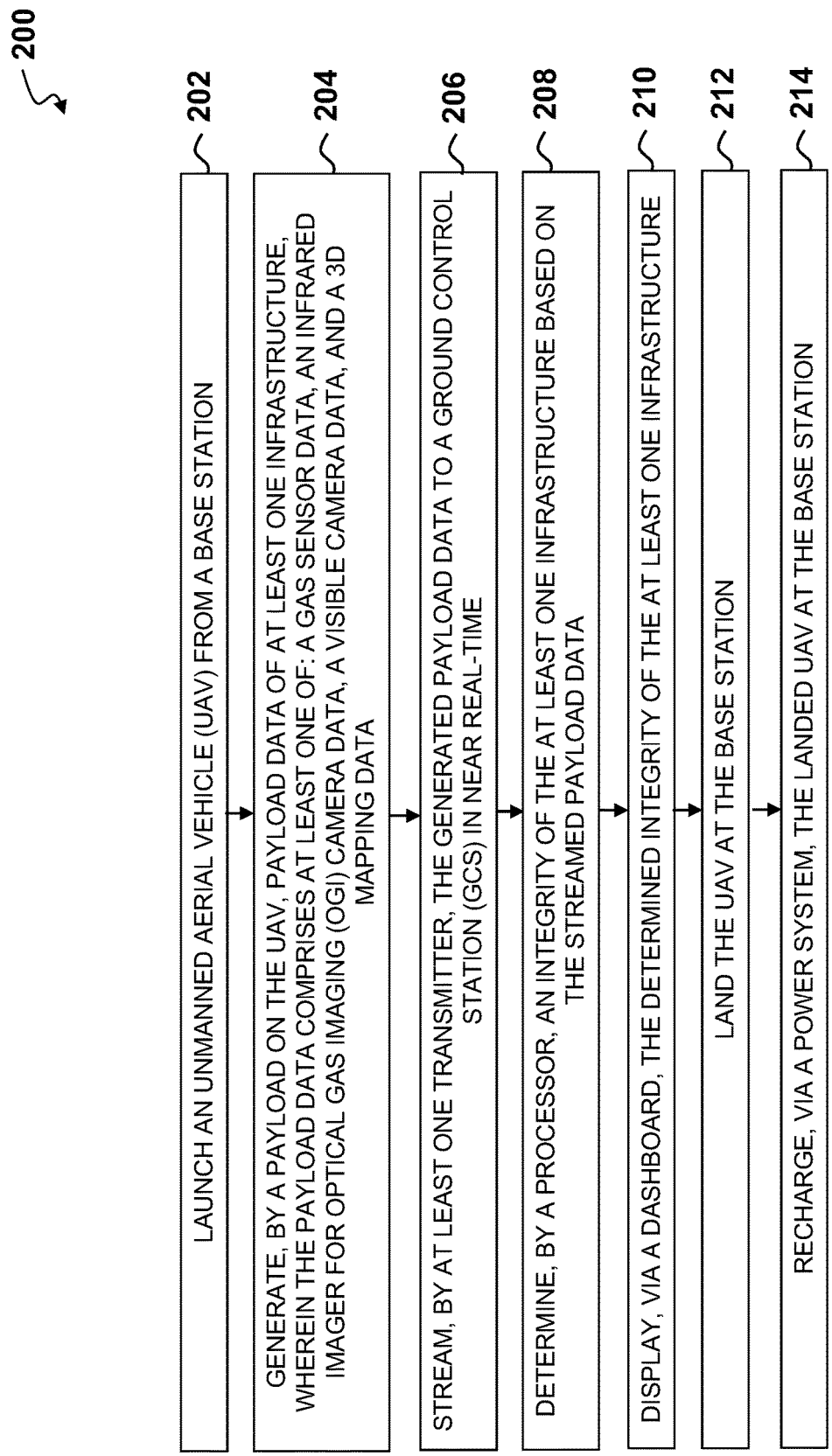
FIG. 2 depicts a high-level flowchart of a method embodiment of determining infrastructure integrity via a UAS gas infrastructure inspection system, according to one embodiment.

FIG. 2 depicts a high-level flowchart of a method embodiment 200 of determining infrastructure integrity via a UAS gas infrastructure inspection system, according to one embodiment. The method 200 may include launching an unmanned aerial vehicle (UAV) from a base station (step 202). In some embodiments, the base station may be disposed on a mobile vehicle. The mobile vehicle may be a car or truck in some embodiments. In some embodiments, the base station may be a permanent structure, such as the all-weather enclosures shown in FIGS. 5A-5C. The method 200 may then include generating, by a payload on the UAV, payload data of at least one infrastructure, where the payload data may comprise at least one of: a gas sensor data, an infrared imager for optical gas imaging (OGI) camera data, a visible camera data, and a 3D mapping data (step 204). In some embodiments, the infrared imager may be tuned to mid-wavelength infrared (MWIR). In some embodiments, the infrared imager may be tuned to long-wavelength infrared (LWIR). In some embodiments, the 3D mapping data may be LIDAR data. The payload may include various combinations of sensors depending on the needs of the infrastructure to be inspected, the desired data, the desired accuracy level, the weight restrictions of the UAV, or the like. The method 200 may then include streaming, by at least one transmitter, the generated payload data to a ground control station (GCS) in near real-time (step 206). The data may be streamed by one or more transmitter, transceivers, or the like. In some embodiments, the data may be transferred after landing for further analysis and processing.

The method 200 may then include determining, by a processor, an integrity of the at least one infrastructure based on the streamed payload data (step 208). In some embodiments, the processor may be a GCS processor. In other embodiments, the processor may be a processor of the payload. In some embodiments, the payload, GCS, and/or cloud server may have a processor configured to determine integrity to a set confidence bound. For example, the payload may determine integrity to a lower confidence bound due to lower processing ability while the cloud server may determine integrity to a higher confidence bound due to higher processing ability. The integrity determination may be that a gas leak is present, that no gas leak is present, that a repair is needed, that a repair may be needed in the future, or the like. The method 200 may then include displaying, via a dashboard, the determined integrity of the at least one infrastructure (step 210). In some embodiments, the dashboard may be a part of the GCS and/or the base station. The dashboard may include a display, processor, and memory. The dashboard may be an Internet portal in some embodiments. The dashboard may be a downloadable application in other embodiments, such as an app on a smartphone, tablet, portable computer, or the like.

The method 200 may then include landing the UAV at the base station (step 212). The base station may include a retractable cover in some embodiments to protect the UAV from weather or the elements. The method 200 may then include recharging, via a power system, the landed UAV at the base station (step 214). The power system may include a battery or other power supply. In some embodiments, a data system of the base station may transfer data to and/or from the UAV.

Figure 3:
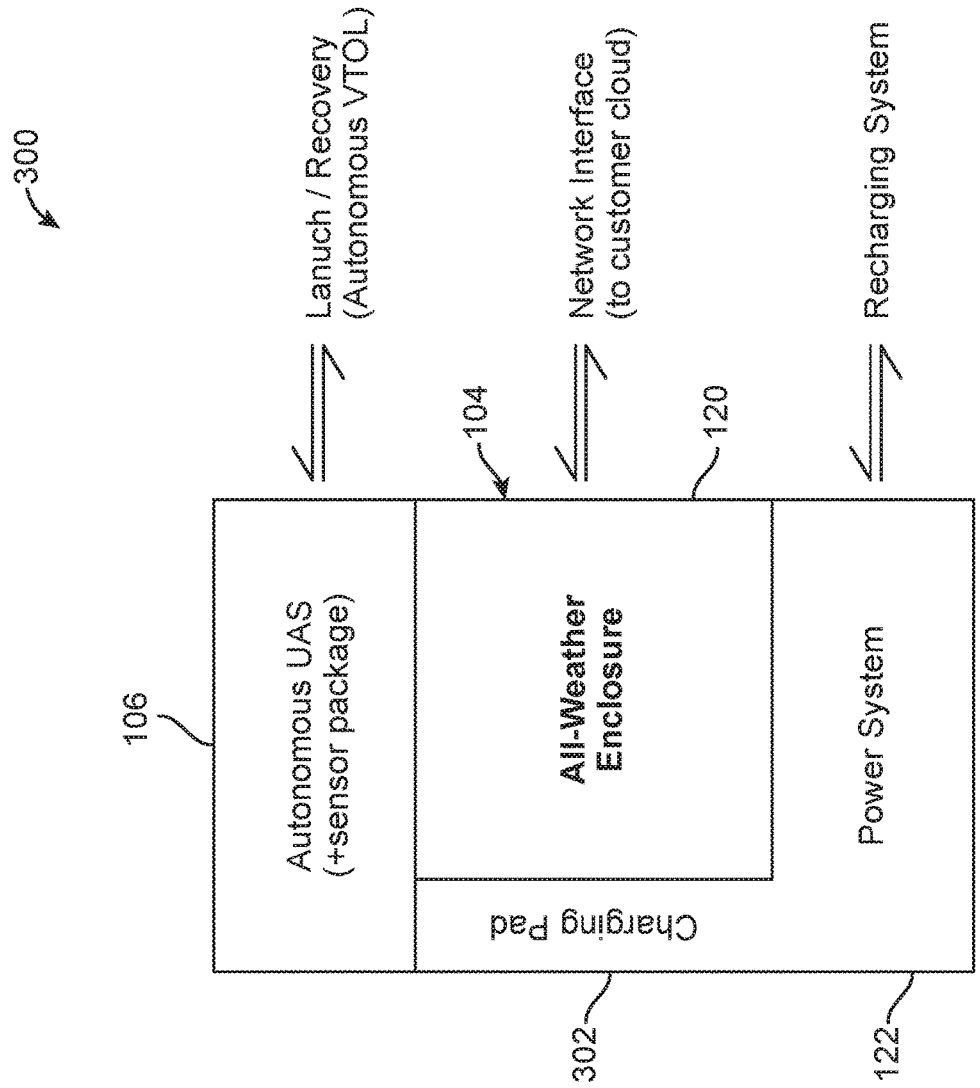
FIG. 3 depicts a high-level system architecture of a portable UAS gas infrastructure inspection system, according to one embodiment.

FIG. 3 depicts a high-level system architecture 300 of a portable UAS gas infrastructure inspection system, according to one embodiment. The autonomous UAV 106 and associated payload may be stored in a base station 104 when not conducting missions. The base station may include an all-weather enclosure 120 and a power system 122. A charging pad 302 may provide power to the UAV 106 and/or payload. The UAV 106 may autonomously be launch and recovered in the base station 104. In some embodiments, the UAV 106 may be a VTOL UAV for vertical take-off and landing. The all-weather enclosure 120 may include a network interface that may transfer data to a customer cloud, GCS, cloud server, or the like. The power system 122 may provide for recharging of the UAV 106 in between missions.

Figure 4C:
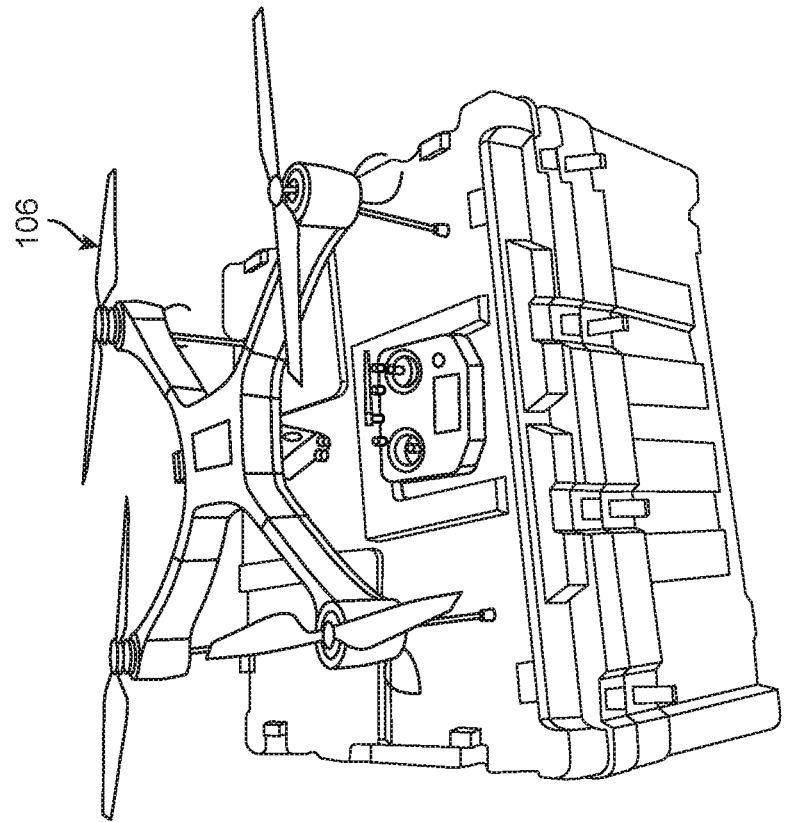
FIGS. 4A-4C depict unmanned aerial vehicles (UAVs) for carrying a payload, according to one embodiment.
Figure 4A:
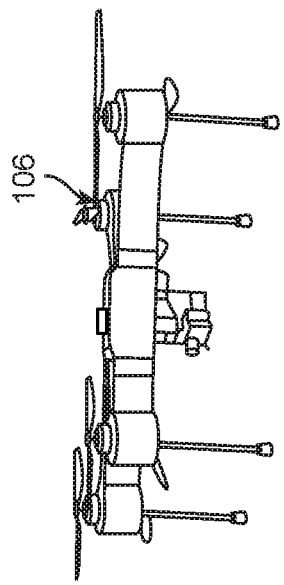
Figure 4B:
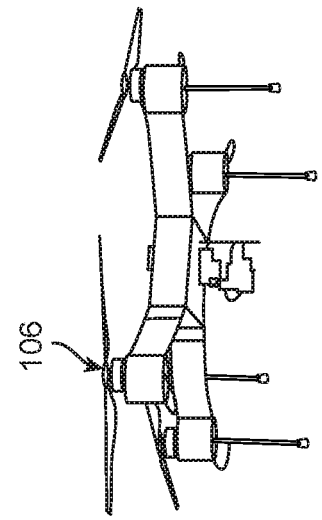

FIGS. 4A-4C depict unmanned aerial vehicles (UAVs) 106 for carrying a payload, according to one embodiment. FIG. 4A depicts a top perspective view of a UAV 106. FIG. 4B depicts a bottom perspective view of the UAV 106. FIG. 4C depicts a top perspective view of a UAV 106 with an associated controller and container for transport and/or storage of the UAV 106. The UAV 106 may be a vertical take-off and landing UAV 106 having a sustained flight time, ability to hover, and ability to fly at a minimal, e.g., <15 m, altitude above the ground or infrastructure for accurate sensor measurements by an attached payload. In some embodiments, the UAV 106 may have two or more rotors for propulsion and movement of the UAV 106.

FIGS. 5A-5C depict all-weather enclosures 120 for transporting, providing power to, and transferring data to or from the UAV, according to one embodiment. FIG. 5A depicts a side view of an all-weather enclosure 120. FIG. 5B depicts a front view of the all-weather enclosure 120. FIG. 5C depicts a perspective view of the all-weather enclosure 120. In one embodiment, the all-weather enclosure 120 may have a telescope hood 500. In one embodiment, the all-weather enclosure 120 may be a seven-foot Aphelion freestanding observatory. In one embodiment, the telescope hood 500 may include two or more flanges, such as four flanges. Each flange may be three feet wide in some embodiments. The all-weather enclosure may include a solid mounting surface, such as slab, fiberglass, or deck; access via a 30×72-inch lockable door; an available motor drive via a computer interface; a closed height of 9'; and/or a total weight of about 200 kg (450 lbs.). In some embodiments, the 9' overall height can be reduced for lower profile and easier transport. In some embodiments, a freestanding base height of the flange may be 36 inches, a dome height may be 44 inches, a base width may be 79 inches, an exterior height may be 111 inches, an internal height from the base to an underside of the flange may be 108 inches, an interior wall width may be 78.5 inches, and/or an access door 502 may be 30 inches wide and 72 inches tall. Alternate dimensions and embodiments are possible and contemplated.

Figure 6:
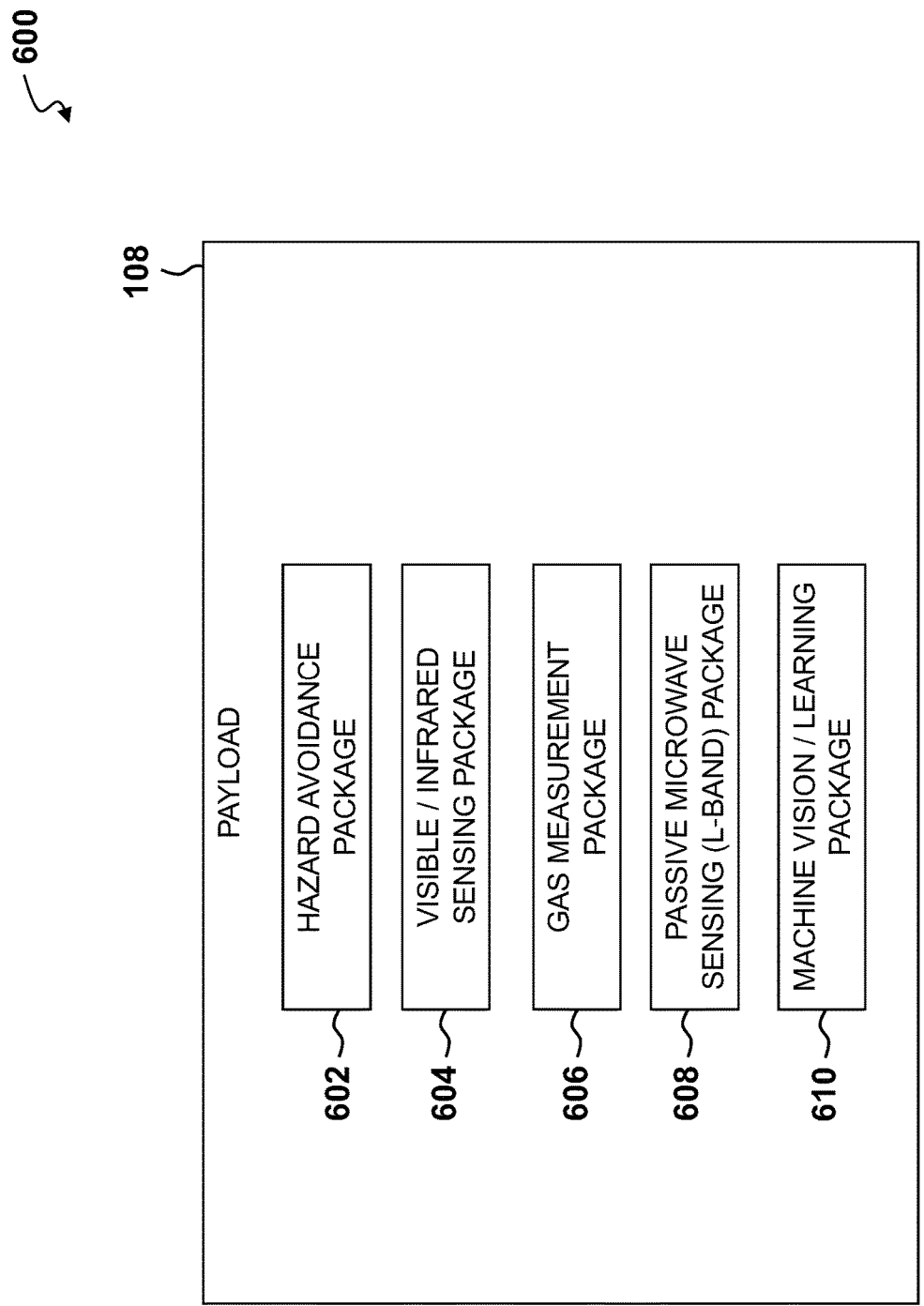
FIG. 6 depicts sensors and/or packages that may be utilized in the payload connected to the UAV, according to one embodiment.

FIG. 6 depicts sensors and/or packages 600 that may be utilized in the payload 108 connected to the UAV, according to one embodiment. Various packages 600 may be used based on the desired measurements, accuracy, payload capacity, and the like. A hazard avoidance package 602 may include a wide field of view (FOV) fixed forward-looking visible camera system coupled with a laser altimeter for accurate height above ground (AGL) to provide for hazard detection and/or avoidance. The outputs from this sensor package may be routed to the UAS autopilot to ensure safe autonomous flight operations. Commercial UAS visible navigation systems and laser altimeters may provide this capability.

A visible/infrared sensing package 604 may combine visible, infrared, and SWIR imaging systems to identify areas of seepage. Wetted areas proximal to pipelines could be used to provide indications (e.g., visible oil, SWIR signature) or temperature differential due to seepage or wet areas (e.g., thermal). The drawbacks of the thermal and SWIR sensing may be small focal plane dimensions (pixels), which may require flights at low altitudes for valuable imagery acquisition. In some embodiments, the visible/infrared sending package 604 may include a visible/short-wave infrared (SWIR)/Thermal package.

A gas measurement package 606, such as the SeekIR sensor by SeekOps Inc. of Austin, Texas may also be used. Evolved gas may be an early indicator of an asset failure and may be extremely useful for low-altitude leak inspection, localization, and quantification operations. The gas measurement package 606 has capabilities for methane (C1) sensing at ppb-sensitivity and/or other target trace gases.

Trace gas sensors are used to detect and quantify leaks of toxic gases, e.g., hydrogen disulfide, or environmentally damaging gases, e.g., methane and sulfur dioxide, in a variety of industrial and environmental contexts. Detection and quantification of these leaks are of interest to a variety of industrial operations, e.g., oil and gas, chemical production, and painting, as well as environmental regulators for assessing compliance and mitigating environmental and safety risks. The performance of trace gas sensors is typically described in terms of sensitivity, i.e., the lowest concentration a sensor can measure and the marginal change in concentration a sensor can measure, and specificity, i.e., how robust the concentration measurement is in a mixture of other gases. Laser-based gas detection techniques are capable of both highly sensitive and specific measurements. Laser-based measurements typically use a laser that emits at a wavelength of light that corresponds to an absorption transition of a chemical species of interest. This light is pitched across an empty space within a solid body, such as a cavity that contains the gas sample. The pitched light can either be at a fixed wavelength or it can be scanned in wavelength. A detector records how much light was transmitted across the cavity. Then, by using the Beer-Lambert relationship, which describes the transmission of light through a sample, i.e., gas in this case, as a function of sample composition and physical properties, e.g., composition, temperature, and pressure, the physical properties of the sample can be inferred. Laser-based trace gas sensors depend heavily on knowledge of the absorption spectrum of a molecule. The absorption spectrum is understood through a quantum-physics-based model that describes the allowable transitions in the energy level of a given molecule. These allowable changes in energy levels correspond to the wavelengths of light the molecule absorbs, and the selection of the energy level transition, or wavelength of light, to use in a trace gas sensor is key to determining the sensitivity and specificity of a sensor.

Passive microwave sensing (L-band) package 608 may also be used. Passive microwave sensing from UAS may be used for soil moisture applications. This technique may be used for surface to centimeter-scale depth moisture mapping at meter-scale spatial resolution.

Machine Vision/Learning package 610 may also be used. Fusing data collected from all sensor types to automatically identify areas of interest in flight. This package 610 leverages machine vision for autonomous source identification and machine learning for source attribution and triaging.

Figure 7:
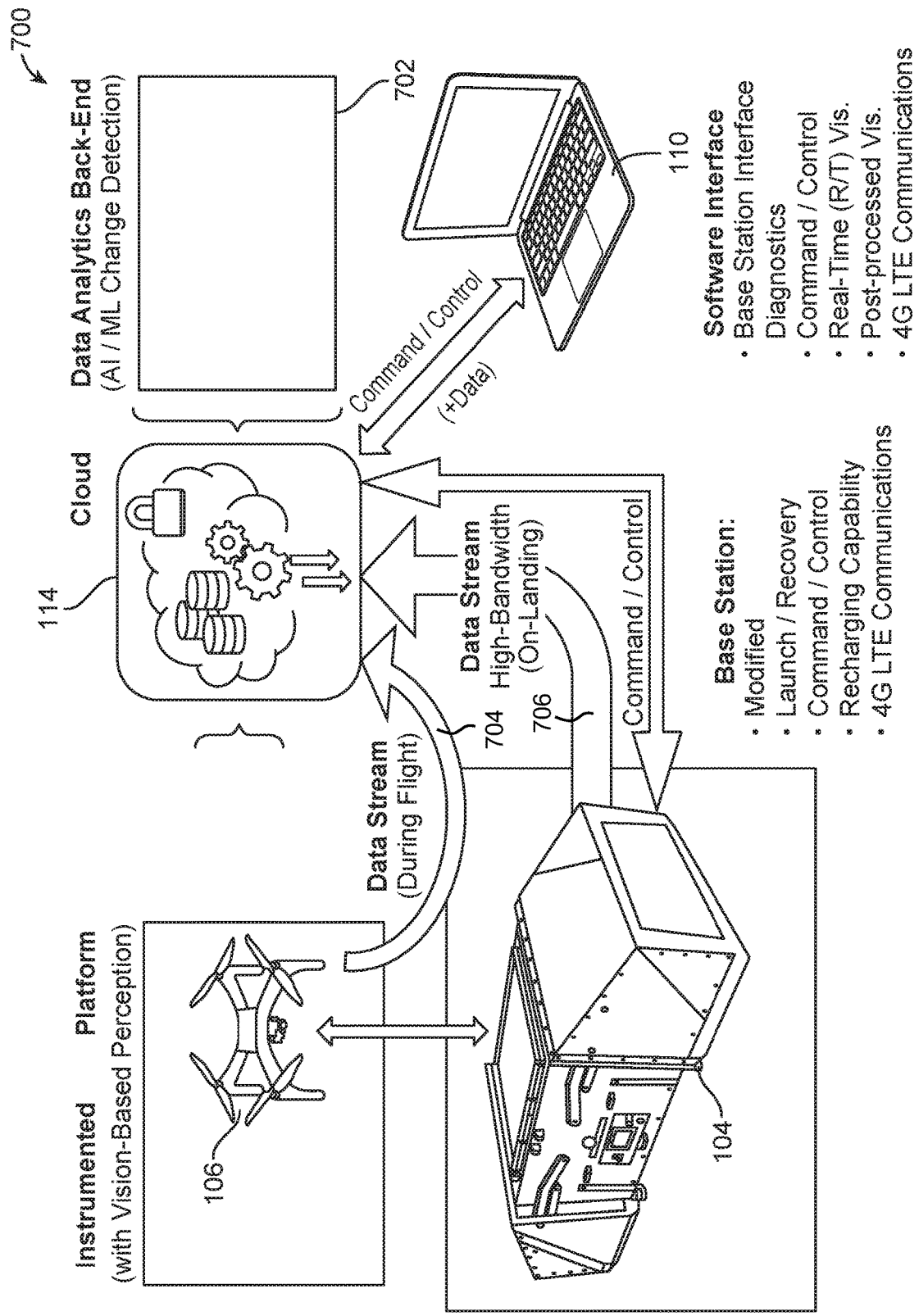
FIG. 7 depicts a high-level block diagram of the data and control exchanges in the UAS gas infrastructure inspection system, according to one embodiment.

FIG. 7 depicts a high-level block diagram of the data and control exchanges in the UAS gas infrastructure inspection system 700, according to one embodiment. A data stream during flight 704 may be streamed between the UAV 106 and payload and a cloud 114. A high-bandwidth data stream 706 may be sent from the base station 104 to the cloud 114 upon landing of the UAV 106 on the base station 104 such that data can be transferred between the UAV 106 and payload and the base station 104. A GCS 110 may send commands/controls to the cloud 114 and transfer data between the GCS 110 and the cloud 114. Back-end data analytics 702 may be used for further processing of the data from the payload.

Figure 8:
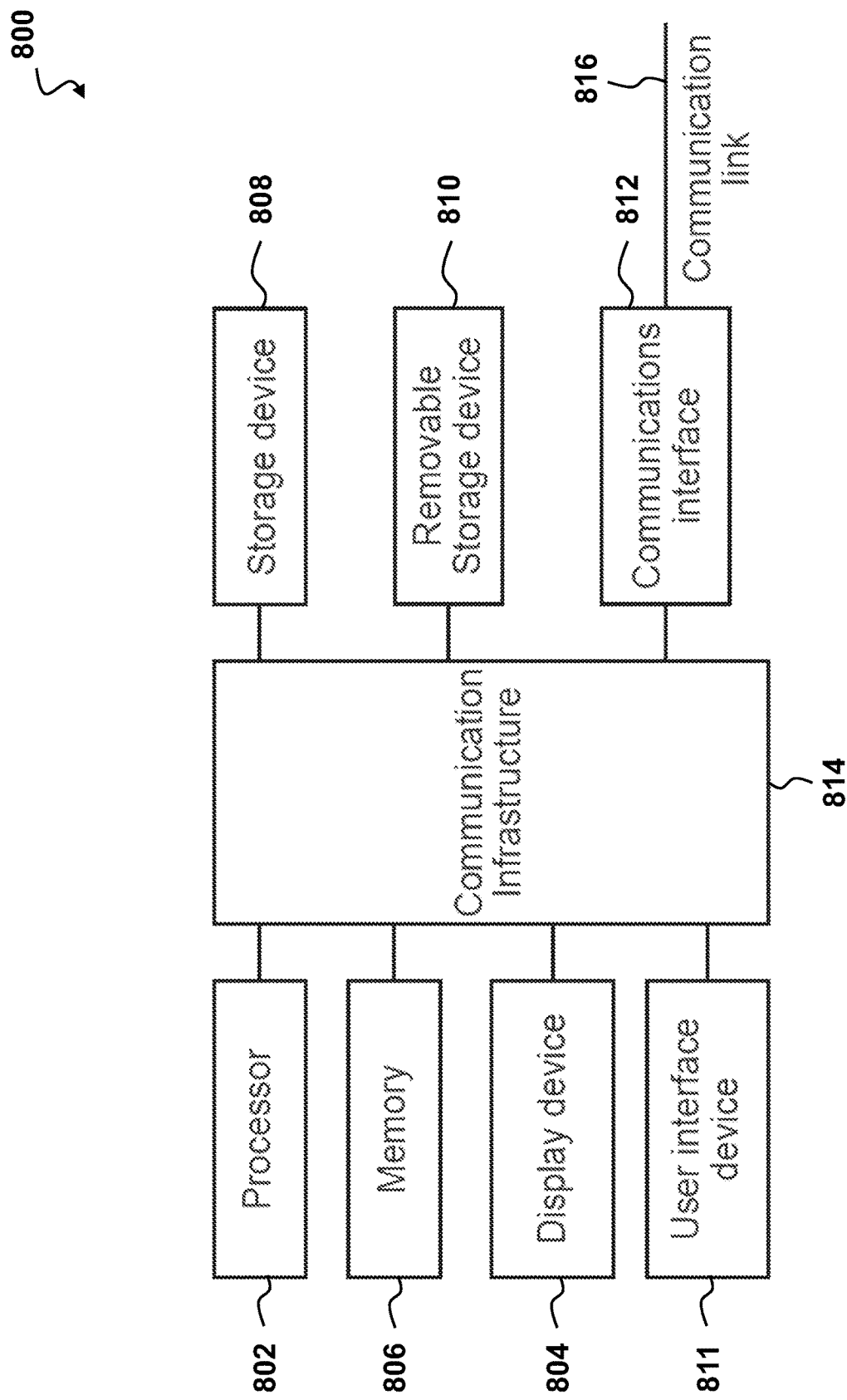
FIG. 8 shows a high-level block diagram and process of a computing system for implementing an embodiment of the system and process.

FIG. 8 is a high-level block diagram 800 showing a computing system comprising a computer system useful for implementing an embodiment of the system and process, disclosed herein. Embodiments of the system may be implemented in different computing environments. The computer system includes one or more processors 802, and can further include an electronic display device 804 (e.g., for displaying graphics, text, and other data), a main memory 806 (e.g., random access memory (RAM)), storage device 808, a removable storage device 810 (e.g., removable storage drive, a removable memory module, a magnetic tape drive, an optical disk drive, a computer readable medium having stored therein computer software and/or data), user interface device 811 (e.g., keyboard, touch screen, keypad, pointing device), and a communication interface 812 (e.g., modem, a network interface (such as an Ethernet card), a communications port, or a PCMCIA slot and card). The communication interface 812 allows software and data to be transferred between the computer system and external devices. The system further includes a communications infrastructure 814 (e.g., a communications bus, cross-over bar, or network) to which the aforementioned devices/modules are connected as shown.

Information transferred via communications interface 814 may be in the form of signals such as electronic, electromagnetic, optical, or other signals capable of being received by communications interface 814, via a communication link 816 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 812. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 9:
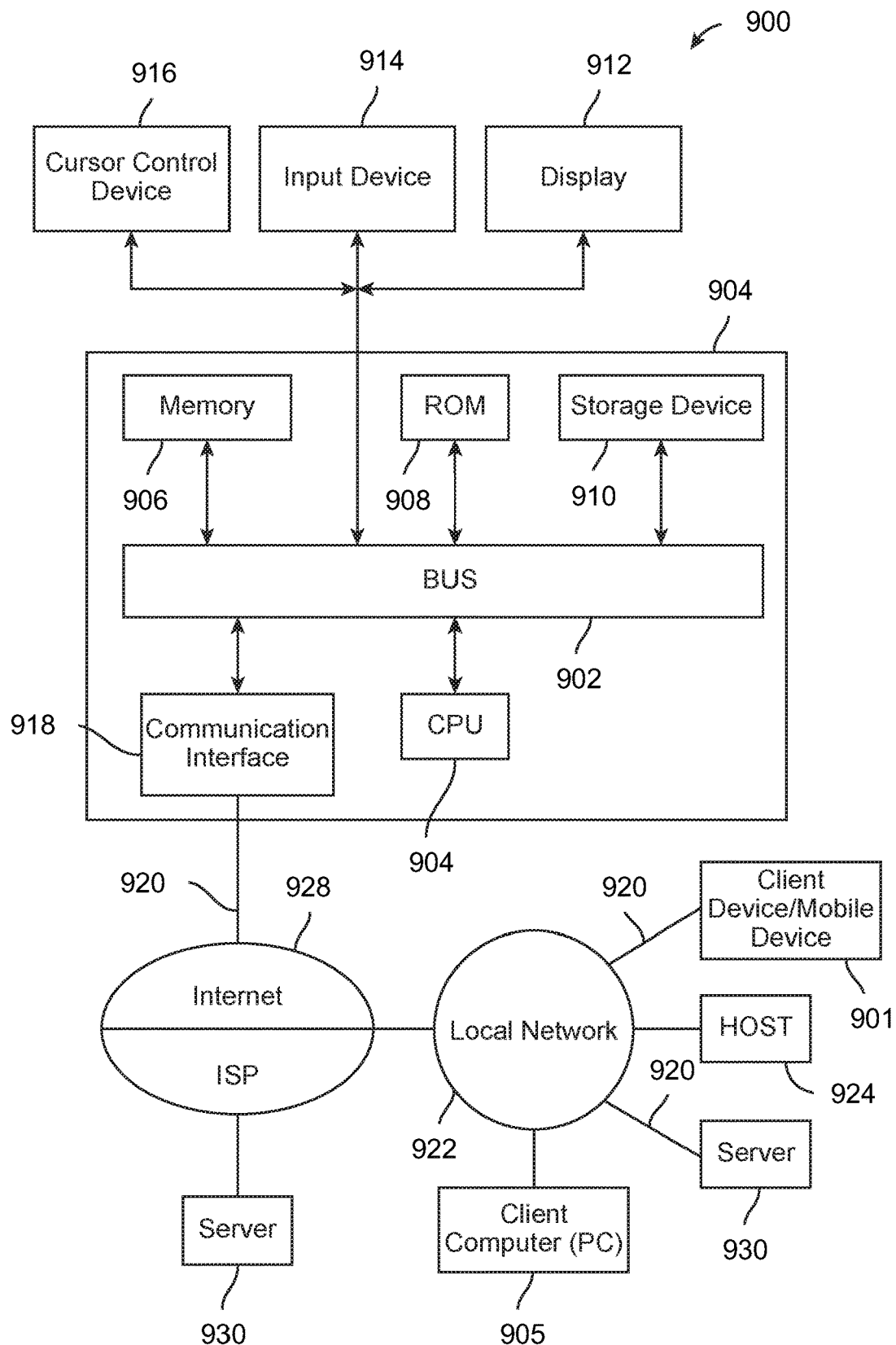
FIG. 9 shows a block diagram and process of an exemplary system in which an embodiment may be implemented.

FIG. 9 shows a block diagram of an example system 900 in which an embodiment may be implemented. The system 900 includes one or more client devices 901 such as consumer electronics devices, connected to one or more server computing systems 930. A server 930 includes a bus 902 or other communication mechanism for communicating information, and a processor (CPU) 904 coupled with the bus 902 for processing information. The server 930 also includes a main memory 906, such as a random access memory (RAM) or other dynamic storage device, coupled to the bus 902 for storing information and instructions to be executed by the processor 904. The main memory 906 also may be used for storing temporary variables or other intermediate information during execution or instructions to be executed by the processor 904. The server computer system 930 further includes a read only memory (ROM) 908 or other static storage device coupled to the bus 902 for storing static information and instructions for the processor 904. A storage device 910, such as a magnetic disk or optical disk, is provided and coupled to the bus 902 for storing information and instructions. The bus 902 may contain, for example, thirty-two address lines for addressing video memory or main memory 906. The bus 902 can also include, for example, a 32-bit data bus for transferring data between and among the components, such as the CPU 904, the main memory 906, video memory and the storage 910. Alternatively, multiplex data/address lines may be used instead of separate data and address lines.

The server 930 may be coupled via the bus 902 to a display 912 for displaying information to a computer user. An input device 914, including alphanumeric and other keys, is coupled to the bus 902 for communicating information and command selections to the processor 904. Another type or user input device comprises cursor control 916, such as a mouse, a trackball, or cursor direction keys for communicating direction information and command selections to the processor 904 and for controlling cursor movement on the display 912.

According to one embodiment, the functions are performed by the processor 904 executing one or more sequences of one or more instructions contained in the main memory 906. Such instructions may be read into the main memory 906 from another computer-readable medium, such as the storage device 910. Execution of the sequences of instructions contained in the main memory 906 causes the processor 904 to perform the process steps described herein. One or more processors in a multi-processing arrangement may also be employed to execute the sequences of instructions contained in the main memory 906. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 904 for execution. Such a medium may take many forms, including but not limited to, non-volatile media, volatile media, and transmission media. Non-volatile media includes, for example, optical or magnetic disks, such as the storage device 910. Volatile media includes dynamic memory, such as the main memory 906. Transmission media includes coaxial cables, copper wire and fiber optics, including the wires that comprise the bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 904 for execution. For example, the instructions may initially be carried on a magnetic disk of a remote computer. The remote computer can load the instructions into its dynamic memory and send the instructions over a telephone line using a modem. A modem local to the server 930 can receive the data on the telephone line and use an infrared transmitter to convert the data to an infrared signal. An infrared detector coupled to the bus 902 can receive the data carried in the infrared signal and place the data on the bus 902. The bus 902 carries the data to the main memory 906, from which the processor 904 retrieves and executes the instructions. The instructions received from the main memory 906 may optionally be stored on the storage device 910 either before or after execution by the processor 904.

The server 930 also includes a communication interface 918 coupled to the bus 902. The communication interface 918 provides a two-way data communication coupling to a network link 920 that is connected to the world wide packet data communication network now commonly referred to as the Internet 928. The Internet 928 uses electrical, electromagnetic or optical signals that carry digital data streams. The signals through the various networks and the signals on the network link 920 and through the communication interface 918, which carry the digital data to and from the server 930, are exemplary forms or carrier waves transporting the information.

In another embodiment of the server 930, interface 918 is connected to a network 922 via a communication link 920. For example, the communication interface 918 may be an integrated services digital network (ISDN) card or a modem to provide a data communication connection to a corresponding type of telephone line, which can comprise part of the network link 920. As another example, the communication interface 918 may be a local area network (LAN) card to provide a data communication connection to a compatible LAN. Wireless links may also be implemented. In any such implementation, the communication interface 918 sends and receives electrical electromagnetic or optical signals that carry digital data streams representing various types of information.

The network link 920 typically provides data communication through one or more networks to other data devices. For example, the network link 920 may provide a connection through the local network 922 to a host computer 924 or to data equipment operated by an Internet Service Provider (ISP). The ISP in turn provides data communication services through the Internet 928. The local network 922 and the Internet 928 both use electrical, electromagnetic or optical signals that carry digital data streams. The signals through the various networks and the signals on the network link 920 and through the communication interface 918, which carry the digital data to and from the server 930, are exemplary forms or carrier waves transporting the information.

The server 930 can send/receive messages and data, including e-mail, program code, through the network, the network link 920 and the communication interface 918. Further, the communication interface 918 can comprise a USB/Tuner and the network link 920 may be an antenna or cable for connecting the server 930 to a cable provider, satellite provider or other terrestrial transmission system for receiving messages, data and program code from another source.

The example versions of the embodiments described herein may be implemented as logical operations in a distributed processing system such as the system 900 including the servers 930. The logical operations of the embodiments may be implemented as a sequence of steps executing in the server 930, and as interconnected machine modules within the system 900. The implementation is a matter of choice and can depend on performance of the system 900 implementing the embodiments. As such, the logical operations constituting said example versions of the embodiments are referred to for e.g., as operations, steps or modules.

Similar to a server 930 described above, a client device 901 can include a processor, memory, storage device, display, input device and communication interface (e.g., e-mail interface) for connecting the client device to the Internet 928, the ISP, or LAN 922, for communication with the servers 930.

The system 900 can further include computers (e.g., personal computers, computing nodes) 905 operating in the same manner as client devices 901, wherein a user can utilize one or more computers 905 to manage data in the server 930.

Figure 10:
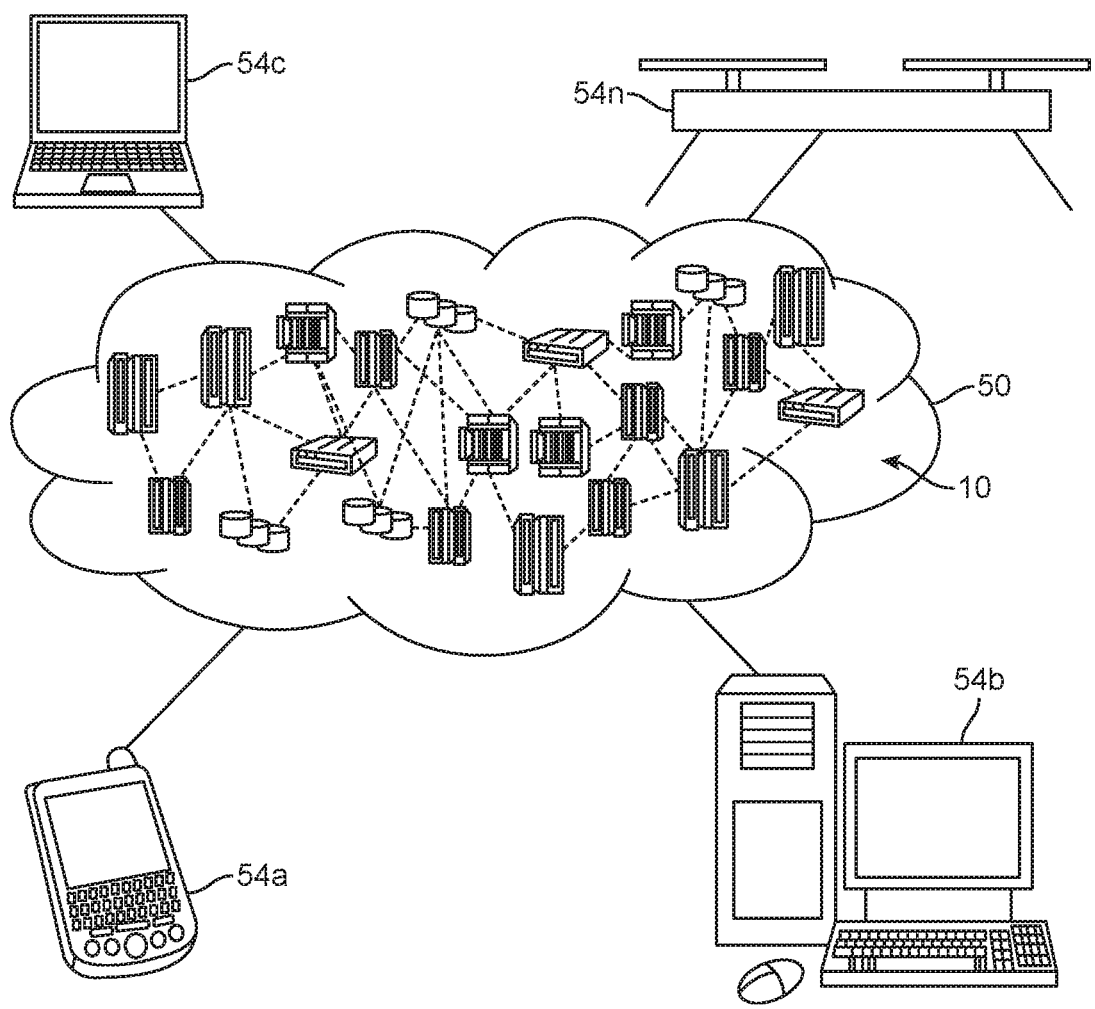
FIG. 10 depicts a cloud-computing environment for implementing an embodiment of the system and process disclosed herein.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or unmanned aerial system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system comprising:
   an unmanned aerial vehicle (UAV), wherein the UAV is configured to be launched to fly a flight plan conducted at a regular frequency;
   a payload disposed on the UAV, wherein the payload is configured to generate payload data of at least one infrastructure during at least one flight plan of the UAV, wherein at least one infrastructure comprises a potential gas emissions source, and wherein the payload data comprises at least one of: a gas sensor data, an infrared imager for optical gas imaging (OGI) camera data, an infrared imager tuned for radiometric measurement camera data, a visible camera data, and a 3D mapping data; and
   a processor in communication with the UAV and the payload, wherein the processor is configured to determine an integrity of the at least one infrastructure based on payload data from the payload, wherein the determined integrity is within a set confidence bound;
   wherein the determined integrity comprises at least one of: an assessment of current conditions of the at least one infrastructure and a predictor for future conditions of the at least one infrastructure; and
   wherein the determined integrity comprises an indication that essentially no gas leak is present at an infrastructure of the at least one infrastructure.

2. The system of claim 1, wherein the determined integrity is the indication that a gas leak is present at an infrastructure of the at least one infrastructure.

3. The system of claim 1, wherein the determined integrity is a repair is currently needed at an infrastructure of the at least one infrastructure.

4. The system of claim 1, wherein the determined integrity is a repair will be needed in the future at an infrastructure of the at least one infrastructure.

5. The system of claim 1, further comprising:
   a ground control station (GCS) in communication with the UAV and the payload, wherein the processor of the GCS is configured to determine an integrity of the at least one infrastructure based on payload data from the payload.

6. The system of claim 1, wherein the processor is at least one of: a payload processor, a GCS processor, and a cloud server.

7. The system of claim 1, further comprising:
   a base station, wherein the UAV is configured to be launched from the base station, and wherein the base station comprises a ground control station (GCS) in communication with the UAV and the payload.

8. The system of claim 1, wherein the infrared imager is an imager tuned to mid-wavelength infrared (MWIR).

9. The system of claim 1, wherein the infrared imager is an imager tuned to long-wavelength infrared (LWIR).

10. A method comprising:
    launching an unmanned aerial vehicle (UAV);
    flying, by the UAV, a flight plan at a regular frequency;
    generating, by a payload on the UAV, payload data of at least one infrastructure during at least one flight plan of the UAV, wherein at least one infrastructure comprises a potential gas emissions source, wherein the payload data comprises at least one of: a gas sensor data, an infrared imager for an optical gas imaging (OGI) camera data, an infrared imager tuned for radiometric measurement camera data, a visible camera data, and a LIDAR data;
    streaming, by at least one transmitter, the generated payload data to a ground control station (GCS) in near real-time; and
    determining, by a processor of the GCS, an integrity of the at least one infrastructure based on the streamed payload data, wherein the determined integrity is within a set confidence bound;
    wherein the determined integrity comprises at least one of: an assessment of current conditions of the at least one infrastructure and a predictor for future conditions of the at least one infrastructure; and
    wherein the determined integrity comprises an indication that essentially no gas leak is present at an infrastructure of the at least one infrastructure.

11. The method of claim 10, wherein the determined integrity is the indication that a gas leak is present at an infrastructure of the at least one infrastructure.

12. The method of claim 10, wherein the determined integrity is a repair is currently needed at an infrastructure of the at least one infrastructure.

13. The method of claim 10, wherein the determined integrity is a repair will be needed in the future at an infrastructure of the at least one infrastructure.

14. The method of claim 10, further comprising:
displaying, via a dashboard of the GCS, the determined integrity of the at least one infrastructure.

15. The method of claim 14, further comprising:
landing the UAV at a base station, wherein the base station is disposed on a mobile vehicle, and wherein the UAV is launched from the base station.

16. The method of claim 15, further comprising:
recharging, via a power system, the landed UAV at the base station.

* * * * *